United States Patent
Mae et al.

(10) Patent No.: US 8,001,191 B2
(45) Date of Patent: Aug. 16, 2011

(54) DATA COMMUNICATION APPARATUS CAPABLE OF REWRITING FIRMWARE

(75) Inventors: Hideo Mae, Toyokawa (JP); Atsushi Tomita, Toyohashi (JP); Hideki Hino, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 2021 days.

(21) Appl. No.: 10/715,024

(22) Filed: Nov. 18, 2003

(65) Prior Publication Data

US 2004/0117464 A1   Jun. 17, 2004

Related U.S. Application Data

(62) Division of application No. 10/106,099, filed on Mar. 27, 2002, now Pat. No. 7,213,052.

(30) Foreign Application Priority Data

Mar. 31, 2001  (JP) .................................. 2001-137939
Mar. 31, 2001  (JP) .................................. 2001-137940
Mar. 31, 2001  (JP) .................................. 2001-137941

(51) Int. Cl.
*G06F 15/16* (2006.01)
(52) U.S. Cl. ........................................ 709/206; 709/238
(58) Field of Classification Search .......... 709/204–207, 709/217–219, 238–244
See application file for complete search history.

(56) References Cited

U.S. PATENT DOCUMENTS 5,617,541 A * 4/1997 Albanese et al. ............. 709/207
5,943,673 A * 8/1999 Felouzis et al. ............ 707/104.1

FOREIGN PATENT DOCUMENTS

| JP | 1-227566 | 9/1989 |
| JP | 5-14930 | 2/1993 |
| JP | 06-195310 | 7/1994 |
| JP | 6-202415 | 7/1994 |
| JP | 7-334436 | 12/1995 |
| JP | 9091129 | 4/1997 |
| JP | 9-146859 | 6/1997 |
| JP | 10-187457 | 7/1998 |
| JP | 10-260845 | 9/1998 |

(Continued)

OTHER PUBLICATIONS

Office Action dated Feb. 12, 2004 for corresponding Japanese Application No. 2001-137940.

*Primary Examiner* — Ian N Moore
*Assistant Examiner* — Bobae K Cheney
(74) *Attorney, Agent, or Firm* — Buchanan Ingersoll & Rooney PC

(57) ABSTRACT

When electronic mail with firmware attached is received at a data communication apparatus, determination is made whether it corresponds to firmware data of a write process allowable state. In the case of write process allowable data, the message is downloaded from a mail server to a printer controller. Then, derived firmware is transmitted to an image formation apparatus. A firmware rewrite permission is obtained. When the firmware attached to the message does not attain a write process allowable state, waiting is conducted for reception of write process allowable firmware with the data left in the mail server. As a result, a data communication apparatus is provided that can rewrite firmware appropriately independent of a transmitted and received order of divided firmware.

7 Claims, 23 Drawing Sheets

FOREIGN PATENT DOCUMENTS

| | | |
|---|---|---|
| JP | 11-17872 | 1/1999 |
| JP | 11-220609 | 8/1999 |
| JP | 11220609 A * | 8/1999 |
| JP | 2000-029648 | 1/2000 |
| JP | 2000029648 A * | 1/2000 |
| JP | 2000-224223 | 8/2000 |
| JP | 2000-261579 | 9/2000 |
| JP | 2000-330917 | 11/2000 |
| JP | 2001-056753 | 2/2001 |

* cited by examiner

F I G. 4
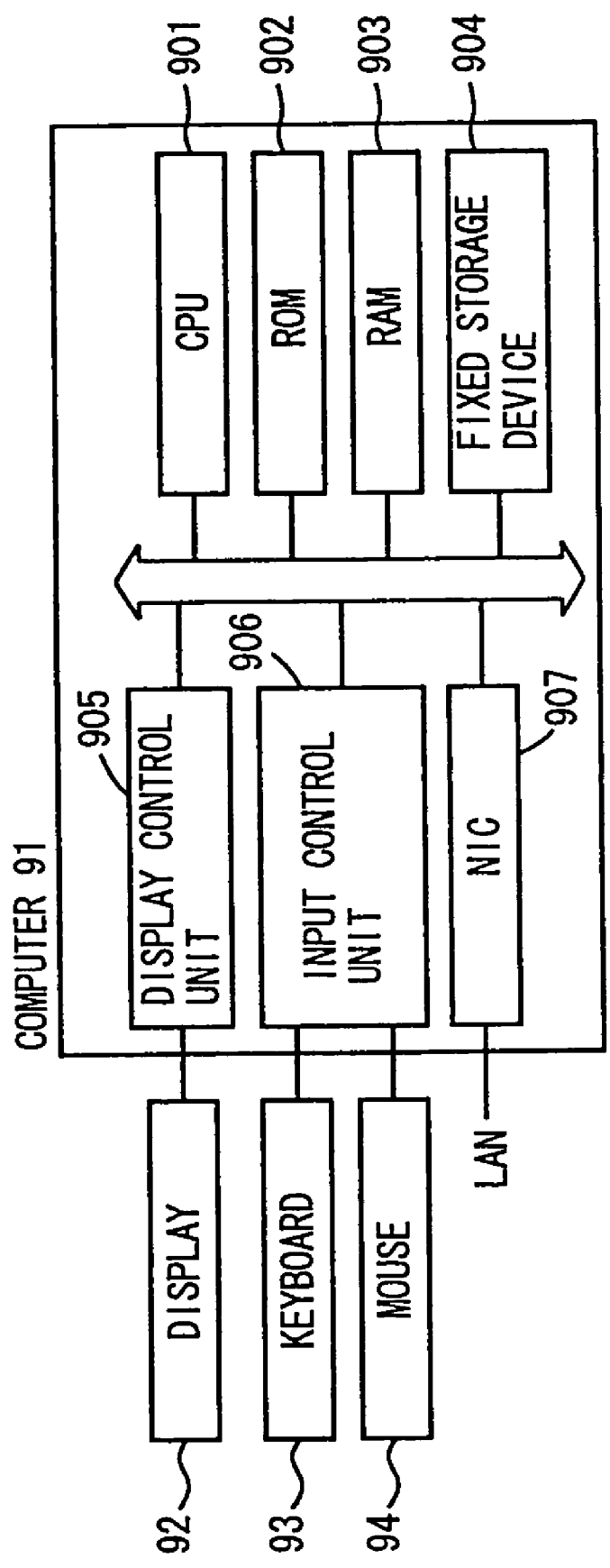

F I G. 6

| No. | MACHINE TYPE | ELECTRONIC MAIL ADDRESS | OTHER INFORMATION... |
|---|---|---|---|
| 1 | mdel1 | device1@customer1.com | ... |
| 2 | mdel2 | device2@customer1.com | ... |
| 3 | mdel3 | device1@customer2.com | ... |
| ... | ... | ... | ... |

FIG. 8

ELECTRONIC MAIL MESSAGE

HEADER REGION
```
From:abc123@service_center.com
To:device1@somecustomer.com
Data:10 Jan 01 13:18:43 +0900
Subject:RE:model1_module1_v10( 1 / 3 )
MIME-Version:1.0
Content-Type:multipart/mixed;boundary="5kvrZF/hrA"
```

↕ BLANK (NULL LINE)

BODY REGION
```
--5kvrZF/hrA
Content-Type:application/octet-stream;name=firmware1.dat
Content-Transfer-Encoding:base64

AXAAABQAAAMAAQ9RAQoNEgAAAAAXAAABQAAAMAAQ9RA1
AAAAHgAAAAAHgAVOMDZAdGRjLm9sdGEgLm1pbm9sdGEuY28uanAKAAA
----
ImBBADEAAWVwbmVOMDZAdGRjLm9sdGEgLm1pbm9sdGEuY28uanAKAAA
XAAABQAAAMAAQ9RAQoNEgAAAAAHgAAAAAHgAQoNEgAAA
AA=

--5kvrZF/hrA--
```

F I G. 1 8
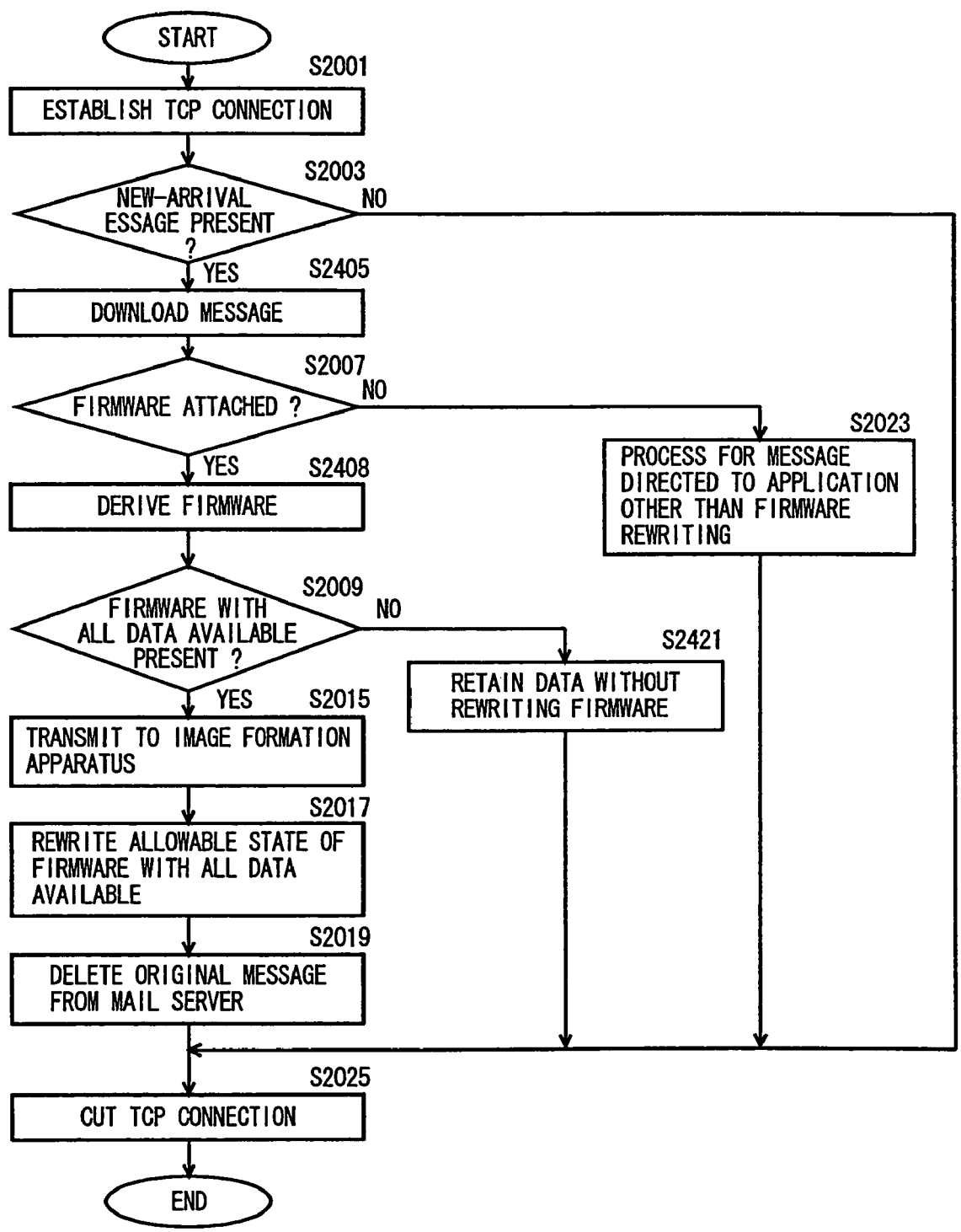

DATA COMMUNICATION APPARATUS CAPABLE OF REWRITING FIRMWARE

This is a divisional of U.S. application Ser. No. 10/106,099, filed Mar. 27, 2002, now U.S. Pat. No. 7,213,052, which is based upon Japanese Application Nos. 2001-137939(P), 2001-137940(P) and 2001-137941(P), filed on Mar. 31, 2001, the contents of which are incorporated herein by reference.

This application is based on applications Nos. 2001-137939, 2001-137940, and 2001-137941 filed in Japan, the contents of which are hereby incorporated by reference.

BACKGROUND OF THE INVENTION

1. Field of the Invention

The present invention relates to a program product for data communication, a computer-readable recording medium in which a data communication program is recorded, a data communication apparatus, and a data communication method. Particularly, the present invention relates to a data communication program providing communication of firmware data via the Internet, a computer-readable recording medium in which the data communication program is recorded, a data communication apparatus, and a data communication method.

2. Description of the Related Art

The firmware controlling the operation of, for example, an image formation apparatus is conventionally written into a mask ROM (Read Only Memory). When the firmware has to be exchanged, the method is taken of replacing the mask ROM on the control board in the image formation apparatus with a mask ROM written with new firmware.

The exchange of a mask ROM is time-consuming and complicated. Therefore, a rewritable flash ROM is used instead of a mask ROM to improve the workability.

Methods set forth below have been taken to exchange the firmware written in a flash ROM.

As the first method, the method of using an external storage device such as a memory card is known. An I/F (interface) with an external storage device such as a memory card is provided in the image formation apparatus. A memory card with the new firmware is connected to that I/F. Then, the new firmware is written from the memory card to the flash ROM. In rewriting the firmware, remote operation is not possible in this method. There was the problem that the rewrite operation must be carried out actually at the site where the image formation apparatus is installed.

A method of utilizing a public switched network is known as the second method. This method is adapted to practical usage mainly in the field of facsimile apparatuses. Specifically, firmware is transmitted to an image formation apparatus from a remote apparatus connected to the public switched network. By downloading the transmission, the firmware is rewritten. Although there is no need to be actually present at the site as in the first method, the communication cost is high. Also, downloading the firmware is relatively time-consuming.

Reflecting the spread of the Internet, downloading the firmware through the Internet instead of through the public switched network is taken as the third method. The usage of the Internet allows reduction in the cost of transmission and the time required to download the firmware.

There are various protocols for communication through the Internet such as an HTTP (Hyper Text Transfer Protocol) to view a home page, an FTP (File Transfer Protocol) to transfer a file, an SMTP (Simple Mail Transfer Protocol) used in the communication of electronic mail, and the like. However, the protocol to download the firmware from a remote station to an image formation apparatus through the Internet is limited from the standpoint of security on the communication through the Internet. The protocol that can be used is rather limited.

Specifically, a firewall generally functioning as a "barrier" is provided at the connection of the Internet and each user to cope with illegal access and the like from the Internet into the user's internal system. The firewall has the capability to control the communication protocol that can be passed between the Internet and the internal system of the user. Accordingly, the passable protocol is limited. In general, the protocol of electronic mail is often set as passable. Therefore, the method of using an electronic mail system is conventionally employed in transmitting firmware via the Internet.

The size of the firmware in an image formation apparatus has now become as large as approximately 10 Mbytes in accordance with the high function and multi-feature thereof. It is expected that the size of the firmware will further increase in the future.

The mail server that collects electronic mail and provides distribution service generally has the size of the electronic mail that can be received restricted. The size of the electronic mail is often restricted to approximately 1 Mbytes.

In the case where firmware of the aforementioned size is to be transmitted through electronic mail, it is expected that rejection of receiving such large electronic mail will frequently occur since it exceeds the restricted size.

To avoid this, there is an approach of appropriately dividing firmware data and transmitting the same instead of transmitting the firmware data at one time. Specifically, the firmware that is to be transmitted is divided into a plurality of parts. The plurality of firmware is attached to separate electronic mail to be sequentially transmitted.

In the sequential transmission of the plurality of firmware for rewriting, there are cases where the rewriting order is determined. Therefore, the firmware is generally transmitted according to the desired order to be rewritten (written in).

However, even if the firmware is appropriately attached to electronic mail and transmitted in a divisional manner by the above-described method, there is a possibility that, during the firmware rewriting operation, the eventual order of the electronic mail received at the image formation apparatus side may differ from the transmitted order due to an error at the mail server side or by other causes.

If the firmware rewriting process is conducted in the received order at the image formation apparatus side in such a case, there is a possibility that the image formation apparatus having the firmware rewritten in an order differing from the proper order of the rewrite process corresponding to the transmitted order will not operate properly.

Furthermore, even if the transmitted order and received order are identical, partially rewriting the target firmware every time a divided firmware is received is not efficient. This is not an appropriate process even from the image formation apparatus side.

SUMMARY OF THE INVENTION

In view of the foregoing, an object of the present invention is to provide a data communication program that can rewrite firmware appropriately independent of the transmitted and received order of divided firmware, a computer-readable recording medium in which the data communication program is recorded, a data communication apparatus, and a data communication method.

Another object of the present invention is to provide a data communication program that can rewrite firmware more efficiently independent of the transmitted and received order of divided firmware, a computer-readable recording medium in which the data communication program is recorded, a data communication apparatus, and a data communication method.

A further object of the present invention is to provide a data communication program that can rewrite firmware in a desired order independent of the transmitted and received order when a plurality of firmware is to be rewritten via a network, a computer-readable recording medium in which the data communication program is recorded, a data communication apparatus, and a data communication method.

According to an aspect of the present invention, a data communication program causes a computer to execute a reception step of receiving electronic mail with firmware attached via a network, an acquirement step of acquiring information relating to a firmware rewrite order from the electronic mail, a determination step of determining whether the firmware attains a write allowable state into a predetermined memory based on the acquired information relating to the firmware rewrite order, and a write step of writing the firmware into the predetermined memory when it is determined the firmware attains a write allowable state by the determination step.

According to the present invention, information relating to the rewrite order of firmware attached to electronic mail is acquired. Based on the acquired information relating to the rewrite order, it is determined whether the firmware attains a write allowable state with respect to a predetermined memory. Then, the firmware is written into the predetermined memory when it is determined the firmware attains a write allowable state.

For example, in the case where divided firmware for a certain module is transmitted and the rewrite order is set in advance, the firmware must be written into the memory according to the preset order. In such a case, determination is made whether a write allowable state is attained or not based on the acquired rewrite order, not the received order of electronic mail. Accordingly, writing into the predetermined memory is carried out in an appropriate order. The inconvenience of a rewritten apparatus operating erroneously will not occur.

Thus, a data communication program is provided that can rewrite firmware appropriately independent of the transmitted and received order of divided firmware.

According to another aspect of the present invention, a data communication program causes a computer to execute a reception step of receiving electronic mail with firmware attached through a network, an acquirement step of acquiring information relating to a firmware rewrite order from the electronic mail, a determination step of determining whether firmware attains a write allowable state into a predetermined memory based on the acquired information relating to a rewrite order, and a transmission step of transmitting the firmware to a predetermined module when it is determined the firmware attains a write allowable state by the determination step.

According to the present invention, information relating to the rewrite order of firmware attached to electronic mail is acquired. Based on the acquired information relating to the rewrite order, determination is made whether the firmware attains a write allowable state with respect to a predetermined memory. When it is determined the firmware attains a write allowable state, the firmware is transmitted to the module where the target memory for firmware rewriting is present.

For example, in the case where divided firmware with respect to a certain module is transmitted and the rewrite order is preset, writing into the memory of a predetermined module must be conducted according to the set order. In this case, it is determined the firmware attains a write allowable state based on the acquired rewrite order, not the received order of electronic mail. Accordingly, writing into the memory of a predetermined module is carried out in an appropriate order. The inconvenience of a rewritten apparatus operating erroneously will not occur.

Thus, a data communication program is provided that can rewrite firmware appropriately independent of the transmitted and received order of divided firmware.

Preferably, the determination step determines a write allowable state when writing of firmware of a rewrite order ahead of the acquired rewrite order into a predetermined memory has ended.

According to the present invention, determination is made that the target firmware can be written when writing of firmware of a rewrite order ahead of the acquired rewrite order into a predetermined memory has ended. Then, the target firmware is written into the memory. Since a write process is effected after firmware of a precedent order has been written into a predetermined memory, firmware is rewritten in an appropriate order. Therefore, the apparatus will operate properly by the rewritten firmware.

According to a further aspect of the present invention, a computer-readable recording medium has any of the above-described data communication program recorded. Therefore, a computer-readable recording medium recorded with a data communication program that can rewrite firmware appropriately independent of the transmitted and received order of divided firmware can be provided.

According to still another aspect of the present invention, a data communication apparatus includes a receiver receiving electronic mail with firmware attached via a network, an acquirement portion for acquiring information relating to the firmware rewrite order from the electronic mail, a determination portion for determining whether the firmware attains a write allowable state into a predetermined memory based on the acquired information relating to a rewrite order, and a writing portion for writing firmware into the predetermined memory when it is determined the firmware attains a write allowable state by the determination portion.

According to the present invention, information relating to the rewrite order of firmware attached to electronic mail is acquired. Based on the acquired information relating to the rewrite order, determination is made whether the firmware attains a write allowable state with respect to the predetermined memory. The firmware is written into the predetermined memory when it is determined the firmware attains a write allowable state.

For example, in the case where firmware divided for a certain module is transmitted and the rewrite order is preset, writing into a memory must be conducted according to the set order. In such a case, it is determined the firmware attains a write allowable state based on the acquired rewrite order, not the received order of the electronic mail. Therefore, writing into a predetermined memory is effected in an appropriate order. The inconvenience of a rewritten apparatus operating erroneously will not occur.

Thus, a data communication apparatus that can rewrite firmware appropriately independent of the transmitted and received order of divided firmware can be provided.

According to a still further aspect of the present invention, an image formation apparatus includes the above-described data communication apparatus. Accordingly, the firmware of an image formation apparatus can be rewritten appropriately independent of the transmitted order of divided firmware.

According to yet a further aspect of the present invention, a data communication method includes a reception step of receiving electronic mail with firmware attached via a network, an acquirement step of acquiring information relating to a firmware rewrite order from the electronic mail, a determination step of determining whether the firmware attains a write allowable state into a predetermined memory based on the acquired information relating to a rewrite order, and a write step of writing firmware into a predetermined memory when it is determined the firmware attains a write allowable state at the determination step.

According to the present invention, a data communication method is provided that can rewrite firmware appropriately independent of the transmitted and the received order of divided firmware.

According to yet another aspect of the present invention, a data communication program causes a computer to execute a determination step of determining whether firmware attached to electronic mail is a part of a predetermined firmware, a confirmation step of confirming existence of remaining firmware of the predetermined firmware when it is determined the firmware attached to electronic mail is a part of the predetermined firmware by the determination step, and a write step of writing, when existence of remaining firmware is confirmed by the confirmation step, the firmware into a predetermined memory together with the remaining firmware.

According to the present invention, the existence of remaining firmware of the predetermined firmware is confirmed when determination is made that the firmware attached to electronic mail is a part of the predetermined firmware. The target firmware is written into the memory together with the remaining firmware only after existence of the remaining firmware has been confirmed.

For example, in the case where a predetermined firmware is firmware corresponding to one module and the remaining firmware is firmware attached to electronic mail, determination is made whether all the remaining firmware is in the mail server or in its own apparatus. Writing of the partial firmware is deferred until all the firmware is available. A rewriting process for one module is conducted as one firmware only after all the firmware is available.

In the case where the predetermined firmware is the firmware required for writing, writing into the memory is disabled unless all the remaining firmware is available. Even in the case where the firmware is not the firmware required for writing and a part of firmware can be rewritten, carrying out a write process every time the firmware is transmitted in an attached manner to electronic mail is not efficient.

Therefore, a data communication program that can rewrite firmware more efficiently independent of the transmitted and received order of divided firmware can be provided by rewriting the firmware at one time only after all firmware is available.

Preferably, the data communication program further causes a computer to execute an information acquirement step of acquiring information relating to firmware from electronic mail present in a mail server, and a firmware acquirement step of acquiring remaining firmware and the firmware attached to electronic mail from the mail server when the existence of remaining firmware is confirmed by the confirmation step. The determination step carries out determination based on the acquired information. In the write step, respective obtained firmware is written into the predetermined memory.

According to the present invention, information relating to firmware such as whether the firmware attached to the electronic mail is a part of a predetermined firmware is acquired from the mail server. When the existence of remaining firmware in the mail server is confirmed, all the firmware is downloaded and written into a predetermined memory in an appropriate order.

The predetermined firmware is downloaded from the mail server only after all the divided firmware is available. Therefore, there will be no occurrence of divided firmware being stored in the apparatus for a long period of time in a state not required. Therefore, the event of firmware data of large size occupying the memory in the apparatus will not occur.

Preferably, the data communication program further causes the computer to execute an acquirement step of acquiring electronic mail from the mail server, and a storage step of storing firmware attached to the acquired electronic mail. The determination step carries out determination based on information related to the firmware obtained from the acquired electronic mail. The write step writes respective stored firmware into the predetermined memory.

According to the present invention, electronic mail is acquired appropriately from the mail server, and the firmware attached thereto is stored in the apparatus. When all the predetermined firmware data is available in the apparatus, a write process into a predetermined memory is carried out. Since the event of electronic mail being left in the mail server is eliminated, the size restriction of the mail server will not be infringed. Since prestored firmware data is used in the rewrite operation, the time required for processing is shortened.

According to yet a still further aspect of the present invention, a data communication program causes a computer to execute a determination step of determining whether firmware attached to electronic mail is a part of a predetermined firmware, a confirmation step of confirming existence of remaining firmware of the predetermined firmware when it is determined the firmware attached to electronic mail is a part of the predetermined firmware at the determination step, and a transmission step of transmitting the firmware to a predetermined module together with the remaining firmware when existence of the remaining firmware is confirmed by the confirmation step.

According to the present invention, the existence of the remaining firmware of the predetermined firmware is confirmed when determination is made that the firmware attached to electronic mail is a part of the predetermined firmware. The target firmware is transmitted to the predetermined module together with the remaining firmware to be written into the memory only after the existence of the remaining firmware is confirmed.

For example, in the case where the predetermined firmware is firmware for one module and firmware of a part thereof is the firmware attached to electronic mail, determination is made whether all the remaining firmware is present in the mail server or in its own apparatus. The transmission of the partial firmware to the predetermined module is deferred until all firmware is available. A transmission process for one module is effected as one firmware only after all the firmware is available. It is not efficient to carry out a transmission process to a module every time one firmware is transmitted in an attached manner to electronic mail. It is also not efficient to carry out a write process every time thereof.

Thus, a data communication program is provided that can rewrite firmware more efficiently independent of the transmitted and received order of divided firmware by transmitting, i.e., writing into a memory, the firmware to the module at one time when all firmware is available.

According to an additional aspect of the present invention, a computer-readable recording medium has the above-described data communication program recorded.

According to the present invention, a computer-readable recording medium recorded with a data communication program that can rewrite firmware more efficiently independent of the transmitted and received order of divided firmware can be provided by carrying out rewriting at one time after all firmware is available.

According to a further additional aspect of the present invention, a data communication apparatus includes a determination portion for determining whether firmware attached to electronic mail is a part of a predetermined firmware, a confirmation portion for confirming existence of remaining firmware of the predetermined firmware when it is determined the firmware attached to electronic mail is a part of the predetermined firmware by the determination portion, and a writing portion for writing, when existence of remaining firmware is confirmed by the confirmation portion, the firmware into the predetermined memory together with the remaining firmware.

According to the present invention, the existence of the remaining firmware of the predetermined firmware is confirmed when determination is made that the firmware attached to electronic mail is a part of the predetermined firmware. The target firmware is written together with the remaining firmware into the memory only after the existence of the remaining firmware is confirmed.

For example, when the predetermined firmware is firmware for one module and a firmware of a part thereof is firmware attached to electronic mail, determination is made whether all the remaining firmware is present in the mail server or in its own apparatus. Writing of the partial firmware is deferred until all the firmware is available. The firmware is written into one module as one firmware only after all the firmware is available.

In the case where the predetermined firmware is firmware required for writing, writing into a memory cannot be conducted unless all the remaining firmware is available. Even in the case where the firmware is not the firmware required for writing and a part of the firmware can be written, it is not efficient to carry out a write process every time the firmware is transmitted in an attached manner to electronic mail.

A data communication apparatus is provided that can rewrite firmware more appropriately independent of the transmitted and received order of divided firmware by conducting rewriting at one time only after all firmware is available.

According to yet an additional aspect of the present invention, the image formation apparatus includes the above-described data communication apparatus. Firmware of an image formation apparatus can be rewritten more efficiently independent of the transmitted order of divided firmware.

According to still another aspect of the present invention, a data communication method includes a determination step of determining whether firmware attached to electronic mail is a part of a predetermined firmware, a confirmation step of confirming, when it is determined the firmware attached to electronic mail is a part of the predetermined firmware at the determination step, the existence of remaining firmware of the predetermined firmware, and a write step of writing firmware into a predetermined memory together with the remaining firmware when existence of the remaining firmware is confirmed by the confirmation step.

Thus, a data communication method is provided that can rewrite firmware more efficiently independent of the transmitted and received order of divided firmware by rewriting the firmware at one time after all firmware is available.

According to another aspect of the present invention, a data communication program causes a computer to execute a confirmation step of confirming reception of electronic mail with one of a plurality of firmware attached, each of the plurality of firmware having a memory write priority level set, an acquirement step of acquiring information relating to the priority level of the one attached firmware from the reception-confirmed electronic mail, a determination step of determining whether the one attached firmware attains a write allowable state into a predetermined memory based on the acquired information-relating to the priority level, and a permission step of permitting writing of one firmware into the predetermined memory when it is determined the one attached firmware attains a write allowable state by the determination step.

According to the present invention, information relating to the priority level of firmware attached to the received electronic mail is acquired. Based on the acquired information relating to the priority level, determination is made whether the attached firmware attains a write allowable state into the predetermined memory. When it is determined the one attached firmware attains a write allowable state, the firmware is written into the predetermined memory.

For example, consider the case where firmware is transmitted corresponding to each module in an apparatus formed of a plurality of modules. In this case, each firmware has a priority level set since the rewrite order is preset. Writing into respective memories must be carried out according to the set priority level. To this end, determination is made whether a write allowable state is attained or not based on the priority level of the firmware, not the received order of the electronic mail. Therefore, even if the electronic mail transmitted according to the priority level is received in an order differing from the transmitted order, writing into a predetermined memory is effected in an appropriate order. The inconvenience of a rewritten apparatus operating erroneously will not occur.

Thus, a data communication program is provided that can rewrite firmware in a desired order independent of the transmitted and received order when plurality of firmware is to be rewritten via a network.

Preferably, the data communication program further causes the computer to execute a write step of writing one firmware into a predetermined memory when writing by the permission step is permitted.

Accordingly, upon receiving permission of writing one firmware, the one firmware is written into a predetermined memory. Therefore, firmware can be written in an appropriate order according to the priority level.

Preferably, the determination step determines a write allowable state when the priority level of the one attached firmware is highest among the plurality of firmware that is not yet written into the memory.

According to the present invention, determination is made that the target firmware attains a write allowable state when the priority level of the one attached firmware is highest among the plurality of firmware that has the memory write priority level set and not yet written into the memory. In the case where firmware of a higher priority level is present, writing is disabled. A write allowable state is attained only after the firmware of a higher priority level is rewritten. Thus, firmware is rewritten in an appropriate order according to the priority level.

According to a further aspect of the present invention, a computer-readable recording medium has the above-described data communication program recorded. A computer-readable recording medium recorded with a data communication program that can rewrite firmware in a desired order independent of the transmitted and received order when plurality of firmware is to be written through a network is provided.

According to still another aspect of the present invention, a data communication apparatus includes a confirmation portion for confirming reception of electronic mail with one of a plurality of firmware attached, each of the plurality of firmware having a memory write priority level set, an acquirement portion for acquiring information relating to the priority level of the one attached firmware from the reception-confirmed electronic mail, a determination portion for determining whether the one attached firmware attains a write allowable state into the predetermined memory based on the acquired information relating to the priority level, and a permit portion for permitting writing of one firmware into a predetermined memory when it is determined the one attached firmware attains a write allowable state by the determination portion.

According to the present invention, information relating to the priority level of firmware attached to the received electronic mail is acquired. Based on the acquired information relating to the priority level, determination is made whether the attached firmware attains a write allowable state into a predetermined memory. When it is determined the one attached firmware attains a write allowable state, the firmware is written into the predetermined memory.

For example, consider the case where firmware for each module of an apparatus formed of a plurality of modules is transmitted. In such a case, each firmware has a priority level set since the rewrite order is preset. The firmware must be rewritten into respective memories according to that priority level. Therefore, determination of a write allowable state is made based on the priority level of the firmware, not the received order of electronic mail. Therefore, even if electronic mail transmitted according to a priority level is received in an order differing from the transmitted order, writing into a predetermined memory is carried out in an appropriate order. The inconvenience of a rewritten apparatus operating erroneously will not occur.

Thus, a data communication apparatus is provided that can rewrite firmware in a desired order independent of the transmitted and received order when a plurality of firmware is to be rewritten via a network.

Preferably, the data communication apparatus further includes a writing portion for writing one firmware into a predetermined memory when writing is permitted by the permit portion. Accordingly, firmware is actually written into a predetermined memory in an appropriate order according to the priority level.

According to still another aspect of the present invention, a data communication method includes a confirmation step of confirming reception of electronic mail with one of a plurality of firmware attached, each of the plurality of firmware having a memory write priority level set, an acquirement step of acquiring information relating to the priority level of the one attached firmware from the reception-confirmed electronic mail, a determination step of determining whether the one attached firmware attains a write allowable state into a predetermined memory based on the acquired information relating to the priority level, and a permission step of permitting writing of one firmware into a predetermined memory when it is determined the one attached firmware attains a write allowable state by the determination step.

According to the present invention, a data communication method is provided that can rewrite firmware in a desired order independent of the transmitted and received order when a plurality of firmware is to rewritten via the network.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram of a circuit structure of a computer installed at a service center side.

FIG. 6 shows an example of data registered in a fixed storage device in an image formation apparatus registration process of FIG. 5.

FIG. 8 shows an example of a message text of electronic mail with divided firmware attached.

FIG. 18 is a flow chart of the details of a firmware read out process when firmware data is retained at the printer controller side in the second embodiment.

DESCRIPTION OF THE PREFERRED EMBODIMENTS

Embodiments of the present invention will be described in detail hereinafter with reference to the drawings.

(1) First Embodiment

Figure 1:
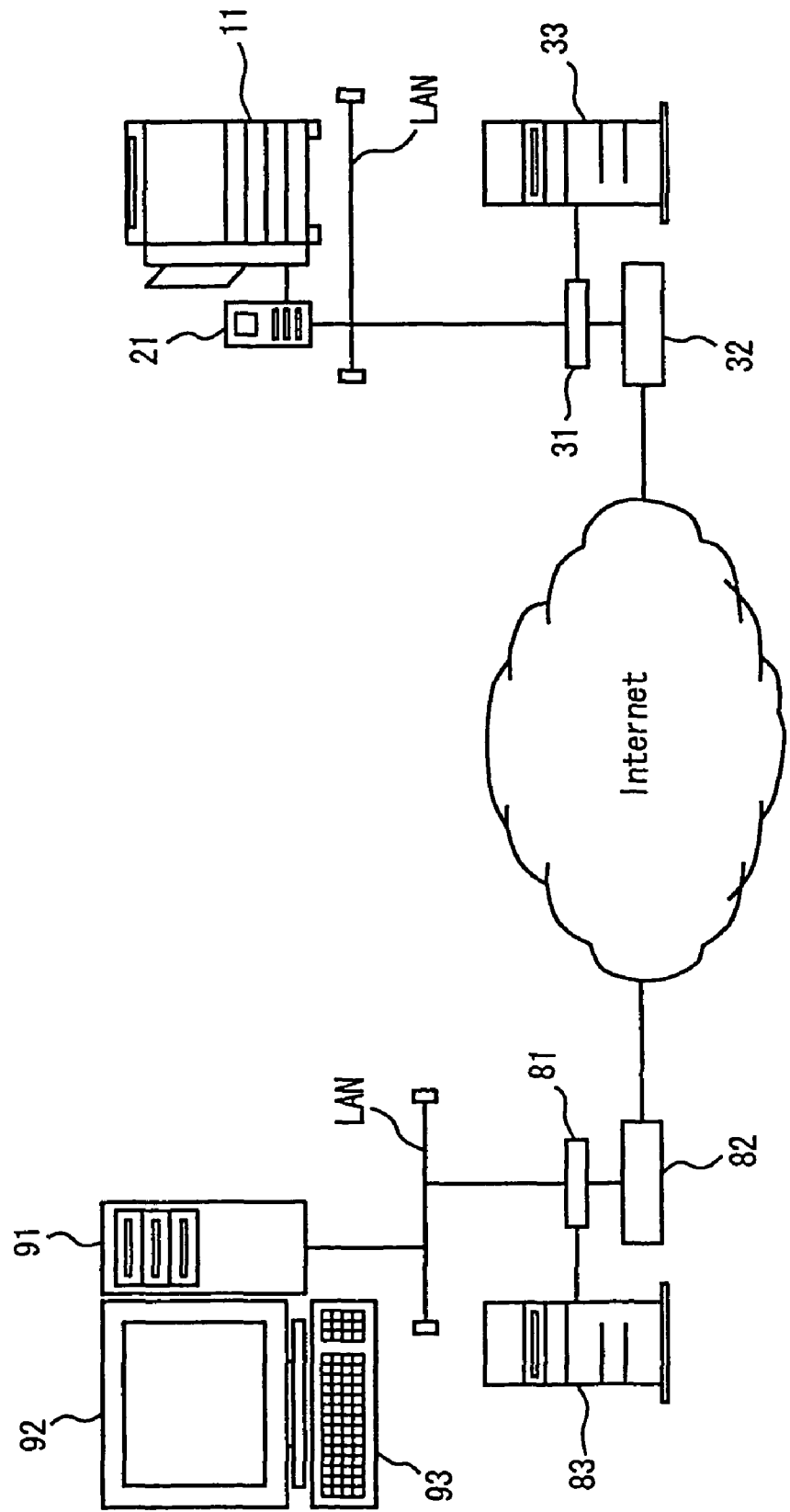
FIG. 1 shows a system structure to implement a firmware communication method according to an embodiment of the present invention.

Here, the case where firmware of an image formation apparatus is rewritten utilizing an electronic mail system will be described. Referring to FIG. 1, the present system is constituted by an apparatus of the user side including a plurality of image formation apparatuses, an apparatus of a service center side to transmit firmware to an image formation apparatus, and the Internet providing connection therebetween.

In the present system, the apparatuses of a plurality of users can be connected to the apparatus of one service center. However, for the sake of simplification, the present system is exemplified corresponding to connection of apparatuses of one user (set).

The apparatus at the user side includes an image formation apparatus 11, and a printer controller 21 connected thereto. Printer controller 21 is connected to a firewall 31 via a LAN (Local Area Network), and further to the Internet via a router 32. Also, a mail server 33 that collects electronic mail and provides distribution service is connected to the LAN.

At the service center side, a computer 91 that transmits firmware is installed. Computer 91 is connected to a firewall 81 via the LAN, and to the Internet via a router 82 to communicate with printer controller 21 of the user side. Also, a mail server 83 that collects electronic mail and provides distribution service is connected to the LAN.

Although not shown, there are a plurality of mail servers on the Internet between router 82 and router 32. Electronic mail is transmitted via these plurality of undefined mail servers. In the Internet, the infrastructure does not guarantee data transmission to a transmission destination, and does not guarantee the data transmission order. The transmission path is indefinite. Also, there is a possibility of missing transmitted data. The mail server that is passed through and the number of mail servers may differ depending upon the electronic mail. Furthermore, the processing time at the mail server differs for each mail server. When electronic mail is transmitted from a transmission source to a transmission destination, there is a possibility that the transmitted order of a plurality of electronic mail from a transmission source (or mail server 83) differs from the received order of the plurality of electronic mail from the destination (or mail server 33) since the electronic mail will be transmitted through a plurality of mail servers in the above-described environment.

A firmware rewrite operation will be described briefly hereinafter. New firmware is attached to electronic mail from computer 91 of the service center side and transmitted towards image formation apparatus 11 of the user side.

The attached firmware may be one firmware, or one of a plurality of appropriately divided firmware. Here, one of a plurality of divided firmware is attached to respective electronic mail to be sequentially transmitted. In this case, the transmitting order of electronic mail is the writing order of the divided firmware.

The electronic mail with the divided firmware attached is delivered through the LAN of the service center side, mail server 83, the Internet, and the LAN of the user side to be stored in a mail box of mail server 33.

When determination is made of the presence of firmware data in a rewrite process allowable state, printer controller 21 of image formation apparatus 11 at the user side downloads the relevant electronic mail message from mail server 33. Firmware is derived from the electronic mail message to be written into the flash ROM that is the subject of rewriting in image formation apparatus 11.

Apparatuses shown in FIG. 1 will be described in detail hereinafter.

Figure 2:
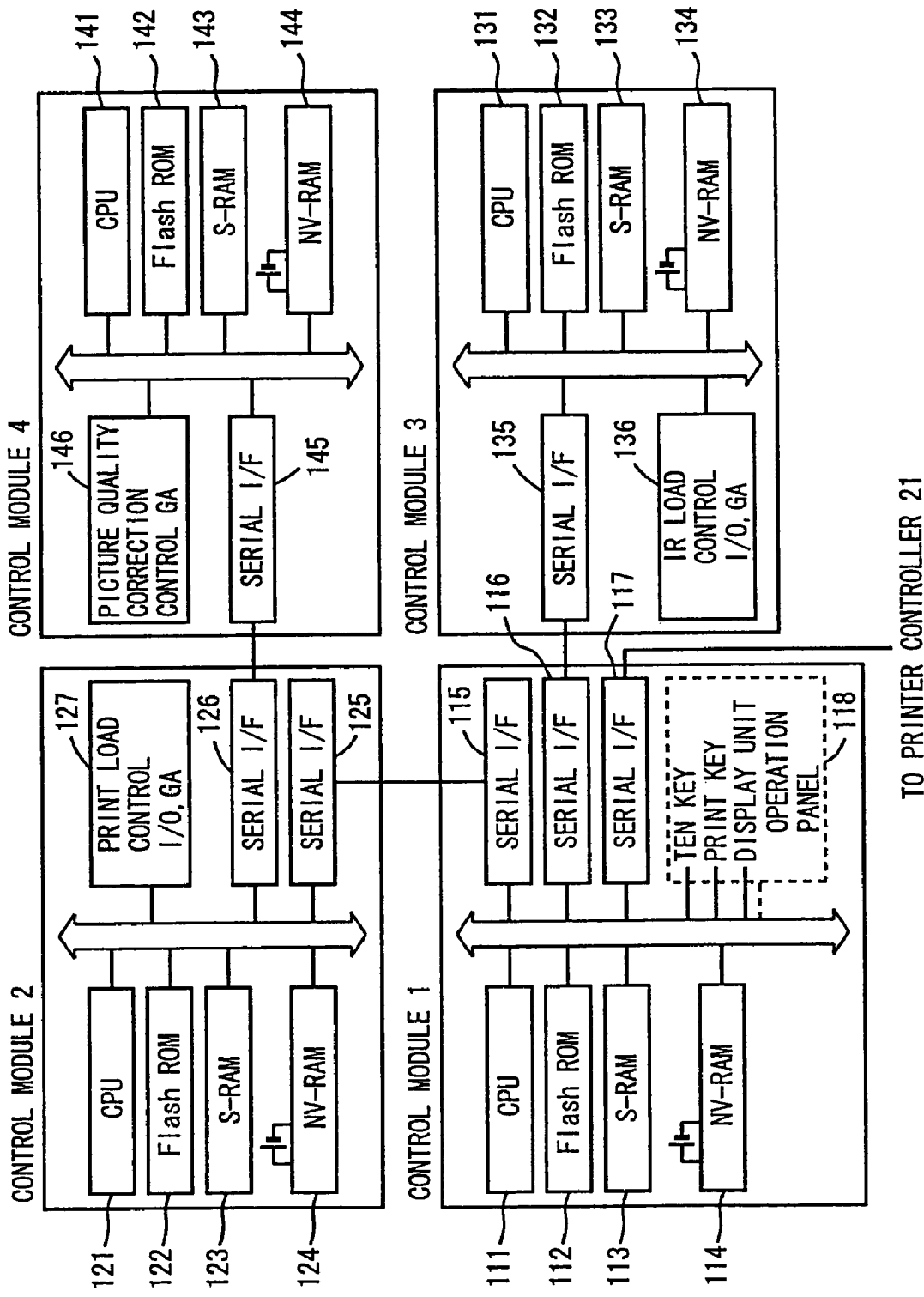
FIG. 2 is a block diagram of a circuit structure of an image formation apparatus.

FIG. 2 is a block diagram of a circuit structure of image formation apparatus 11. Referring to FIG. 2, image formation apparatus 11 is an apparatus of a multi CPU (Central Processing Unit) configuration to scan a document image and form a copy image on a sheet. Image formation apparatus 11 is constituted by four control modules, i.e., a control module 1-a control module 4, corresponding to each CPU.

Control module 1 includes a CPU 111 providing overall control of image formation apparatus 11, a rewritable flash ROM 112 stored with firmware, an S(static)-RAM 113 that is a working region, an NV (non-volatile)-RAM 114 with battery-backup for storing various set values, a serial I/F 115 transmitting/receiving various control data to/from control module 2, a serial I/F 116 transmitting/receiving various control data to/from control module 3, a serial I/F 117 transmitting/receiving various data to/from printer controller 2, and an operation panel 118 with various keys and displays.

Control module 2 includes a CPU 121 controlling the print process of image formation apparatus 11, a rewritable flash ROM 122 having firmware stored therein, an S-RAM 123 that is a working area, an NV-RAM 124 with battery-backup for storing various setting values, a serial I/F 125 transmitting/receiving various control data to/from control module 1, a serial I/F 126 transmitting/receiving various control data to/from control module 4, and a print load control I/O, GA 127 controlling the load of an image formation apparatus.

Control module 3 includes a CPU 131 controlling the read process of a document image in image formation apparatus 11, a rewritable flash ROM 132 in which firmware is stored, an S-RAM 133 that is a working area, an NV-RAM 134 with battery-backup for storing various set values, a serial I/F 135 transmitting/receiving various control data to/from control module 1, and an IR load control I/O, GA 136 controlling the load of the read processes of a document image.

Control module 4 includes a CPU 141 controlling the correction of the picture quality for image formation apparatus 11, a rewritable flash ROM 142 in which firmware is stored, an S-RAM 143 that is a working area, an NV-RAM 144 with battery-backup for storing various set values, a serial I/F 145 transmitting/receiving various control data to/from control module 2, and a picture quality correction control GA 146 providing picture quality correction control.

These control modules 1-4 execute communication via the serial I/F. In general, the control command and control information between the CPU of each module is transmitted/received. When firmware is to be rewritten, firmware data is transmitted. Since the communication via a serial I/F is based on a structure conforming to the communication data size of the control command and control information generally used, transmission of data of a large size such as firmware is time-consuming. There are cases where transmission of firmware is more time-consuming than the transmission of electronic mail from center PC 91 to image formation apparatus 11 depending upon the data size of the firmware.

Figure 3:
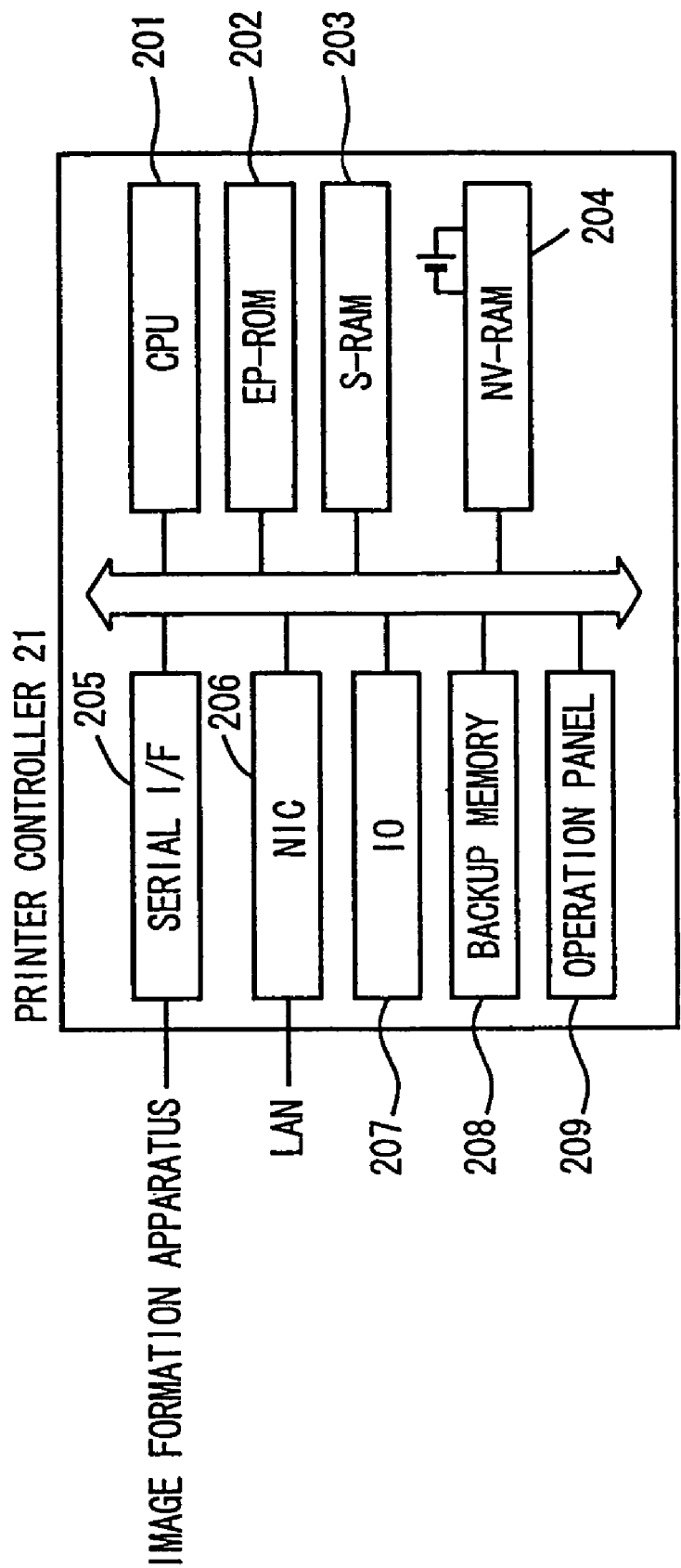
FIG. 3 is a block diagram of a circuit structure of a printer controller.

FIG. 3 is a block diagram of a circuit structure of printer control 21. Referring to FIG. 3, printer controller 21 includes a CPU 201, an EPROM 202 in which the control program thereof is stored, an S-RAM 203 that is a working area, an NV (non-volatile)-RAM 204 storing various set values, a serial I/F 205 transmitting/receiving various data to/from image formation apparatus 11, an NIC (Network Interface Card) 206 to transmit/receive various data through the LAN, an IO 207 with an output port to control the power source, a backup memory 208 to save various data, and an operation panel 209 to provide various inputs.

NV-RAM 204 stores, in addition to its own IP address, the mail server IP address required for printer controller 21 to download from mail server 33 an electronic mail message addressed to itself (image formation apparatus 11), as well as the name and password of its own electronic mail account.

FIG. 4 is a block diagram of a circuit structure of computer 91 installed at the service center side. Referring to FIG. 4, computer 91 includes a CPU 901 providing overall control of the apparatus, a ROM 902 in which a program and the like are stored, a RAM 903 that is a working region and a region where various data are temporarily stored, a fixed storage device 904 where various information are stored, a display control unit 905 controlling a display 92, an input control unit 906 controlling a keyboard 93 and a mouse 94, and an NIC 907 to transmit/receive various data to/from an external source through the LAN.

Fixed storage device 904 stores registration information of an image formation apparatus including the machine type and electronic mail address of image formation apparatus 11, and the restricted size information set at the mail server. Also, the firmware corresponding to the machine type of the image formation apparatus 11 is stored.

An operator at the service center prestores the firmware in a predetermined different folder/directory in fixed storage device 904 according to the machine type and control module thereof.

The operation of rewriting the firmware in an image formation apparatus from a remote station according to the system of FIG. 1 will be described hereinafter.

The process carried out at CPU 901 mounted in computer 91 of the service center will be described with reference to FIGS. 5-7.

Figure 5:
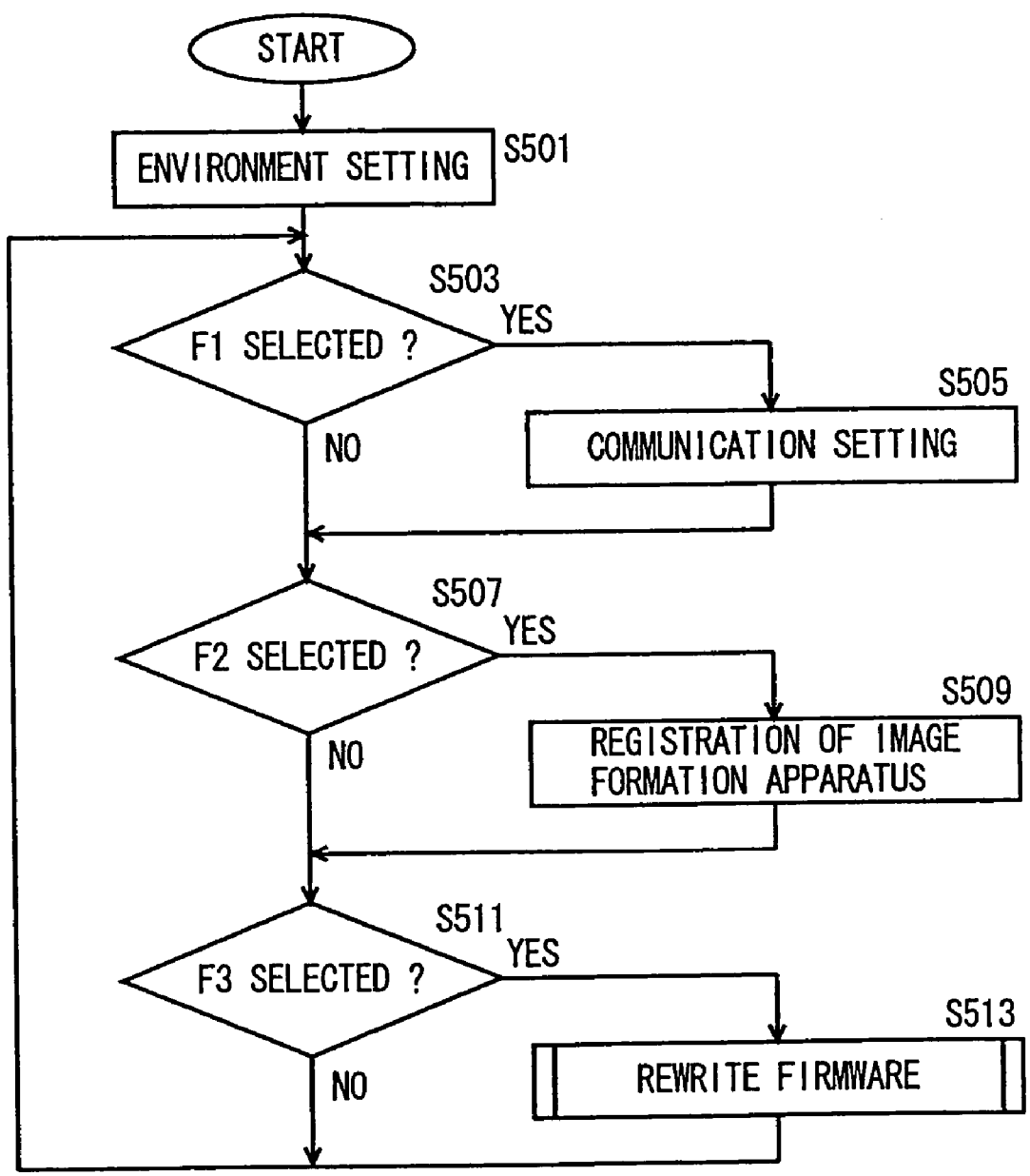
FIG. 5 is a flow chart of the main routine of a process carried out by a CPU of the computer at the service center side.

FIG. 5 is a flow chart of the main routine of the process carried out by CPU 901 of computer 91 at the service center. CPU 901 commences the process in response to the power being turned on. First, an initialization process generally carried out by the computer is executed such as initialization of the memory and parameters (step S501). Then, in response to an input operation of various function keys (F1 to F3) on keyboard 93, a communication set process (step S505), an image formation apparatus registration process (step S509), or a firmware transmission process (step S513) is carried out.

When key F1 is input (YES at step S503), a communication set process is carried out at step S505. Specifically, the parameters required for electronic mail transmission by computer 91 are set. For example, the IP address of mail server 83 connected to the LAN at the service center side, the electronic mail address of computer 91 and the like are input and stored in fixed storage device 904. The electronic mail address of computer 91 is set in the From field when computer 91 transmits electronic mail with firmware attached to printer controller 21.

When key F2 is input (YES at step S507), a registration process of an image formation apparatus is carried out at step S509. Specifically, the machine type of each image formation apparatus, the electronic mail address, restricted size information set at the corresponding mail server, as well as information of the name, address, telephone number and the like of the user of each image formation apparatus are stored in fixed storage device 904.

When key F3 is input (YES at step S511), a firmware transmission process is carried out at step S513. Specifically, firmware of the machine type that is the target of rewriting is divided and attached to separate electronic mail to be transmitted to image formation apparatus 11.

FIG. 6 shows an example of data registered in fixed storage device 904 at the image formation apparatus registration process (step S509) of FIG. 5. The operator of the service center inputs information associated with the relevant image formation apparatus using keyboard 93, mouse 94 and the like to computer 91, prior to rewriting the firmware of the image formation apparatus.

As shown in FIG. 6, the information associated with the image formation apparatus includes the machine type of the image formation apparatus, the electronic mail address, and other information. Additionally, user information such as the name, address, telephone number and the like of the user of the image formation apparatus can be included to facilitate identification of the image formation apparatus.

The information associated with the image formation apparatus is input to computer 91 and stored in fixed storage device 904 in a table format as shown in FIG. 6. For the sake of simplification, this information in a table format is referred to as "registration information table" hereinafter.

The process flow of an electronic mail message with firmware attached being generated by computer 91 and transmitted to image formation apparatus 11 when the firmware of the image formation apparatus has to be rewritten will be described hereinafter. FIG. 7 is a flow chart of the details of the firmware transmission process (step S513) of FIG. 5, executed by CPU 901 of computer 91.

Figure 7:
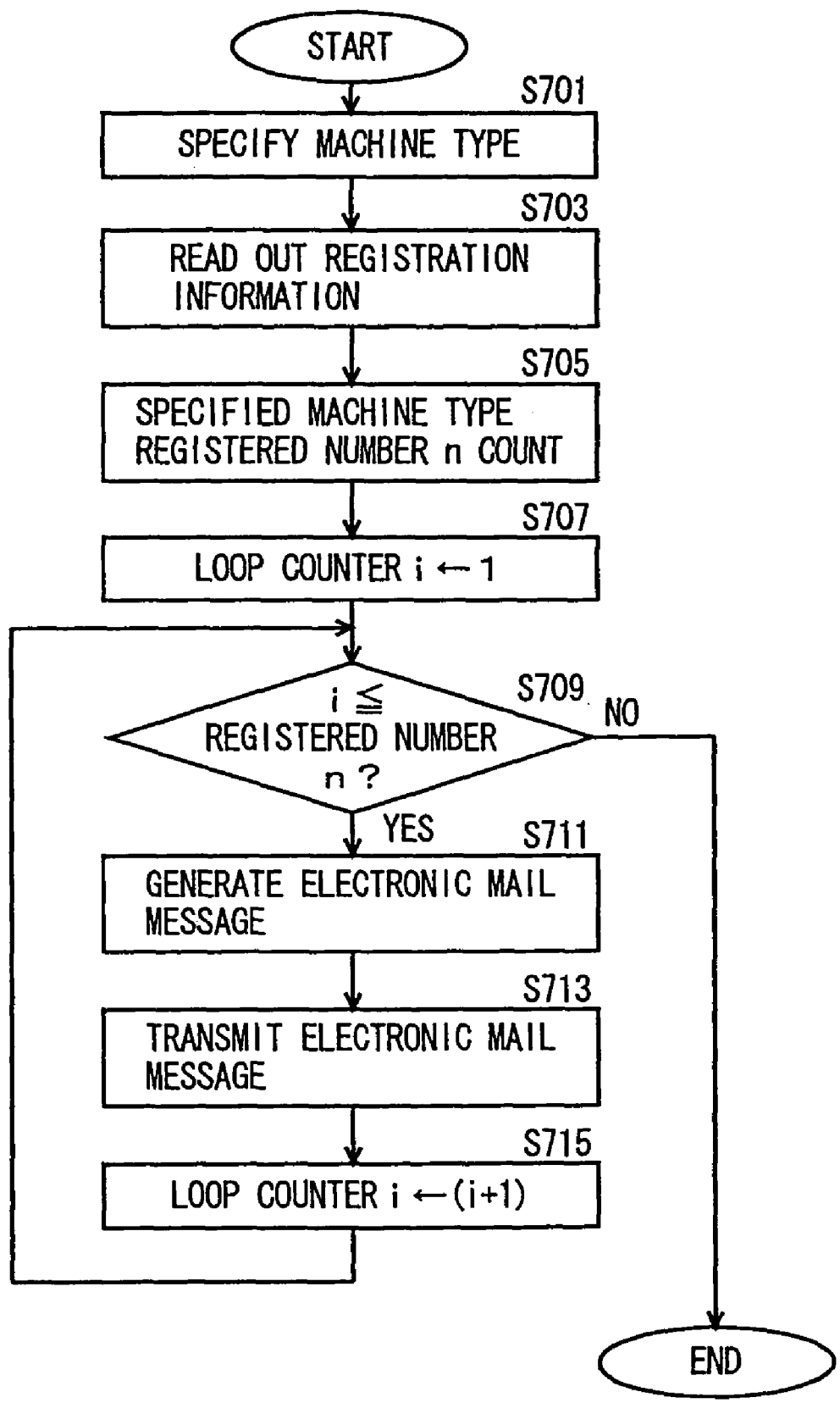
FIG. 7 is a flow chart of the details of a firmware transmission process of FIG. 5.

Referring to FIG. 7, the operator of the service center uses keyboard 93, mouse 94 and the like to specify the machine type of the image formation apparatus that is the target of firmware rewriting as well as the control module thereof to computer 91 at step S701. The machine type and control module are specified since the firmware of an image formation apparatus generally differs depending upon the machine type and the control module.

At step S703, the registration information table (FIG. 6) stored in fixed storage device 904 is read out. At step S705, the registered number n for the machine type of the specified image formation apparatus is counted. At step S707, 1 is set in the loop counter. Thereafter, appropriate division and the like of the firmware and an electronic mail transmission process are carried out for the image formation apparatus of the specified machine type until the value of loop counter i exceeds the registered number n.

Specifically, at step S709, the value of loop counter i is compared with the registered number n of the specified machine type. When the value of loop counter i is equal to or smaller than the registered number n (YES at step S709), control proceeds to step S711 where an electronic mail message with firmware attached is generated with respect to the electronic mail address of the i-th image formation apparatus of the machine type.

At the service center side, the size of the mail to be transmitted is restricted in advance to, for example, 1 Mbytes. The firmware is divided so that the size of the divided firmware does not exceed the restricted size. Then, an electronic mail with the divided firmware attached is generated.

The method of dividing firmware is not limited to division based simply on the restricted size. A method may be taken in which the firmware is divided in the multi-chip unit, and then further divided if the size of the divided firmware still exceeds the restricted size.

The restricted size set at the service center side is variable, and may be registered for each user.

At step S713, the generated electronic mail message is transmitted towards an image formation apparatus. Specifically, connection with mail server 83 is established based on the IP address of mail server 83 set at step S505 of FIG. 5. Then, an electronic mail message is transmitted to mail server 83 according to the SMTP protocol (RF C821) that is the Internet standard of electronic mail transmission.

When electronic mail is transmitted, control proceeds to step S715 where the value of loop counter i is incremented by 1. Then, the control returns to step S709. Thus, the process from step S709 to step S715 is carried out for all the image formation apparatuses with respect to the specified machine type registered in the registration information table.

When the process for all the apparatuses equal to the specified machine type registered in the registration information table is completed (NO at step S709), the firmware transmission process ends.

By the above-described process, the event of transmission being disabled can be avoided since the firmware is divided and transmitted appropriately even when the size of the firmware for the specified machine type is larger than the size restriction set at the mail server.

Electronic mail with firmware attached will be described in detail hereinafter with reference to FIG. 8. FIG. 8 shows an example of a message text of electronic mail with divided firmware attached.

Referring to FIG. 8, the message field of electronic mail is mainly divided into a header region and a body region, delimited by a NULL line therebetween, according to the Internet standard (RFC 822) relating to an electronic mail message.

The header region is formed of a plurality of header fields defined by the Internet standard (RFC 822). Each header field is constituted by a field name from the beginning to ":", and a subsequent field body.

It is to be noted that the firmware of an image formation apparatus is binary data. It is inhibited by RFC 822 to directly write binary data into the message of electronic mail. Therefore, the MIME (Multipurpose Internet Mail Extensions) defined by RFC 2045, 2046, 2047 is utilized to attach the firmware of an image formation apparatus as a file in the body region of the message.

In addition to the fields of "From", "To", "Date", "Subject" and the like defined by RFC 822, the fields of "MIME-Version" and "ContentType" corresponding to the MIME extension definitions are provided at the header region of the message.

In the field body of the Subject field, a character string of the name of the machine type specified by the operator and the number of the target control module of the firmware to be attached, connected by an under bar, are written. For example, when the machine type is "model1" and the number of the target control module is "1", a character string of "model1_module1" is provided. In the case where the attached firmware data is a divided one, numbers indicating the divisor value and the order among the divided firmware data are added at the end. For example, when the relevant firmware corresponds to the first of firmware divided into 3 parts, the character of (1/3) is added at the end. In the case where the attached firmware data is not a divided one, no description of the division number and the like will be provided.

In the field body of the Content-Type field, "Multipart/mixed" is specified so as to set the message body region dividable into a plurality of parts, and an appropriate US-ASCII character string ("5kvrZF/hrA" after the character string here) is specified for the "Boundary" parameter indicating the boundary of respective parts.

In the body region of the message, a character string with "--" added to the beginning of the value of the boundary parameter ("5kvrZF/hrA" here) of the Content-Type field of the header region is written to specify the beginning of one part. The Content-Type field is written below to specify "application/octet-stream" indicating that the file attached to the field body is binary data.

Therebelow, the "Content-Transfer-Encoding" field is written to specify "base64" in the field body. Since direct description of binary data into the message of the electronic mail is inhibited by RFC 822, binary data must be converted into US-ASCII text. According to the MIME extension definition, a plurality of schemes for the conversion are defined. The Base 64 scheme is one thereof.

The binary data of firmware is converted into US-ASCII character by the Base 64 scheme and added below the above-described two fields. Lastly, a character string with "--" added before and after the value of the boundary parameter ("5 kvrZF/hrA" here) of the Content-Type field of the header region is written.

Figure 9:
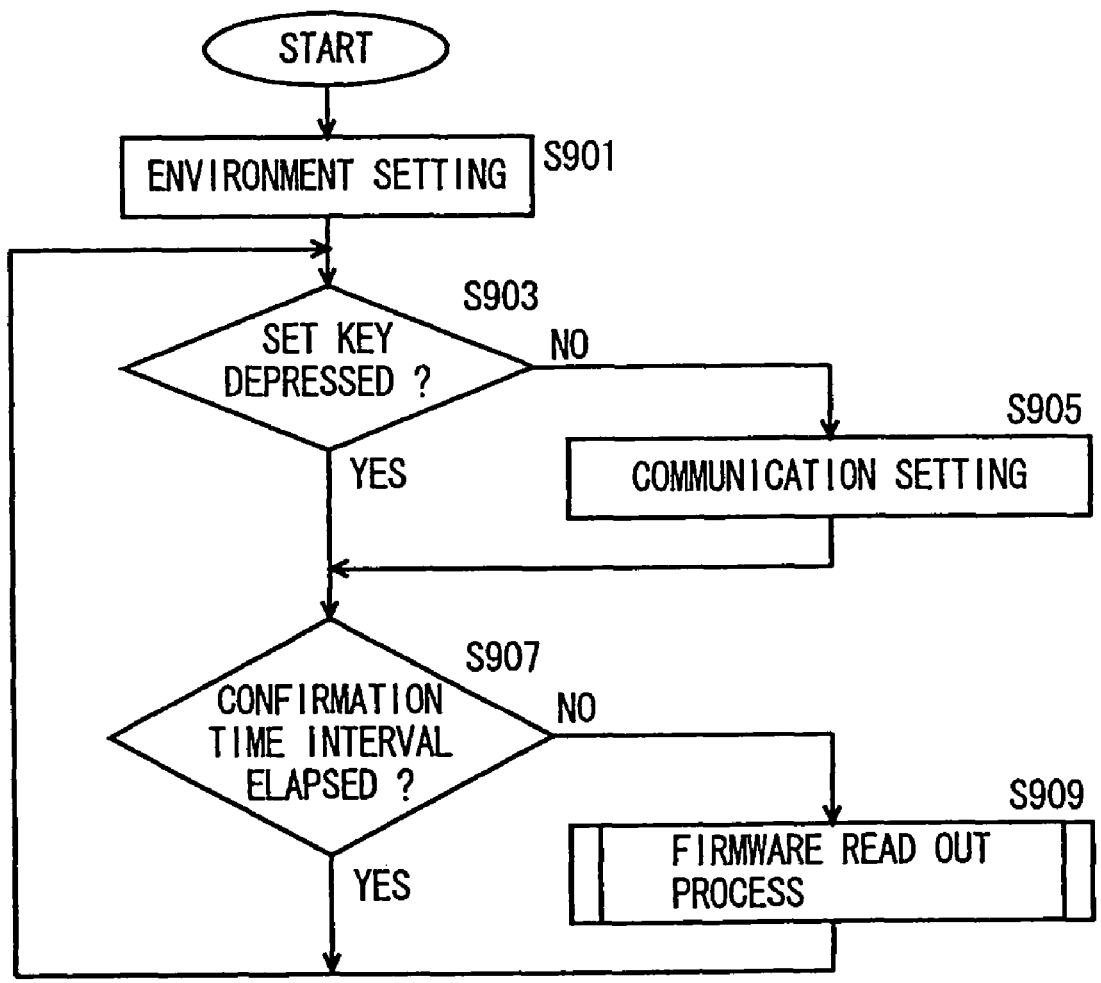
FIG. 9 is a flow chart of the main routine of a process carried out by a CPU of a printer controller of an image formation apparatus.

The process at the user side will be described hereinafter. FIG. 9 is a flow chart of the main routine of the process carried out by CPU 201 of printer controller 21 of image formation apparatus 11. Referring to FIG. 9, CPU 201 commences the process by having power turned on. The initialization process generally carried out by a computer such as initialization of a memory and parameters is carried out (step S901). Then, a communication set process (step S905) or a firmware read out process (step S909) is carried out, as necessary.

For example, when key "SET" on operation panel 209 is input by the user (YES at step S903), control proceeds to step S905 where parameters required to transmit/receive electronic mail are set. Specifically, the IP address of mail server 33 connected to the LAN of the user side, the name and password of the electronic mail account of image formation apparatus 11 on mail server 33, the electronic mail address of image formation apparatus 11, a time interval to periodically confirm whether new electronic mail address towards image formation apparatus 11 has arrived or not, and the like are input and stored in NV-RAM 204.

At step S907, determination is made whether the time interval for confirmation has elapsed or not. Specifically, determination is made whether the time interval set at step S905 (the time interval to confirm whether electronic mail message addressed to image formation apparatus 11 has newly arrived or not) has elapsed or not.

When the time interval has elapsed (YES at step S907), control proceeds to step S909 where CPU 201 confirms whether a new electronic mail message has been delivered with respect to mail server 33, and downloads the required electronic mail, when delivered. When the time interval for confirmation has not yet elapsed (NO at step S907), control returns to, for example, step S903, where the above process is repeated until the time interval for confirmation has elapsed.

The process carried out by CPU 201 of printer controller 21 at the user side will be described hereinafter.

Figure 10:
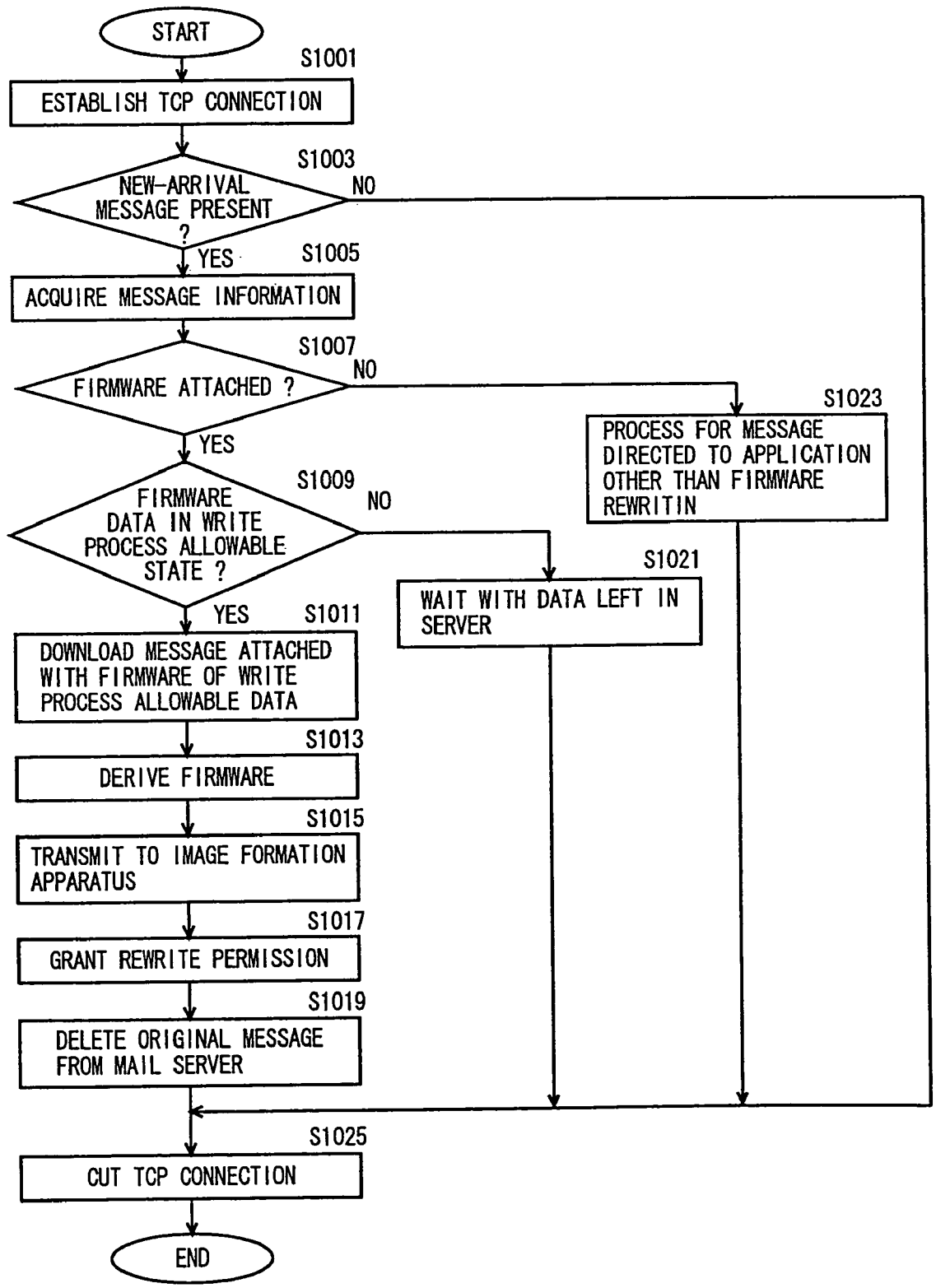
FIG. 10 is a flow chart of the details of a firmware read out process of FIG. 9.

FIG. 10 is a flow chart of the details of a firmware read process (step S909) of FIG. 9. At step S1001, the TCP connection with mail server 33 is established based on the IP address of mail server 33 set at step S905 of FIG. 9. Delivery of a new message addressed to image formation apparatus 11 is confirmed (step S1003).

A POP 3 (Post Office Protocol Version 3) protocol is used in this confirmation process and in the process that will be described afterwards of downloading a new message addressed to image formation apparatus 11, when delivered to mail server 33.

When a new message addressed to image information apparatus 11 is delivered to mail server 33 as a result of confirming any new-arrival messages (YES at step S1003), control proceeds to step S1005 where that message is downloaded from mail server 33. The Subject information of the header region in the message is acquired.

At step S1007, determination is made whether the electronic mail has firmware attached. Attachment of firmware can be identified by, for example, whether the description in the field body in the "Content-Description" field in the header region of the message is "Firmware" or not.

When firmware is attached (YES at step S1007), control proceeds to step S1009 where determination is made whether the firmware data attains a write process allowable state. Specifically, when the character of 2/3 or the like indicating division is recognized in the Subject field, identification is made that the firmware is divided. Then, a check is made whether divided firmware that has been transmitted previously, i.e. divided firmware data including the character of 1/3 in the subject field of the same code, has already been processed or not.

When it is confirmed that writing of the relevant firmware data has already ended, control proceeds to step S1011 since the target divided firmware attains a write process allowable state. The message with that firmware attached is downloaded from mail server 33 to printer controller 21.

At step S1013, the US-ASCII character of the firmware region is extracted from the downloaded message. The extracted US-ASCII character is restored into binary data by reverse Base 64 conversion. At step S1015, binary data and module number are transmitted via serial I/F 205 to CPU 111 of image formation apparatus 11.

When the firmware data and module number are transmitted, control proceeds to step S1017 where the firmware rewrite permit flag for image formation apparatus 11 is turned on, whereby rewriting permission is granted. At step S1019, the original message is deleted from the mail server. At step S1025, the TCP connection with mail server 33 is cut.

When determination is made at S1009 that the target firmware attached to the message does not attain a write process allowable state (NO at step S1009), waiting is conducted for reception of write process allowable firmware with the data left in mail server 33 (step S1021). In the case where the character of 2/3 or the like indicating division is identified in the Subject field, or in the case where identification is made that the divided firmware of 1/3 is not yet processed, a write process cannot be conducted unless the writing process of the divided firmware of 1/3 has ended. Therefore, determination is made here that the firmware data of 2/3 does not attain a write allowable state.

When firmware is not attached to the downloaded message (NO at step S1007), control proceeds to step S1023 where a process that is carried out for a message directed to an application other than firmware rewriting is executed in a general manner.

When there is write process allowable firmware data in printer controller 21 of image formation apparatus 11, the message is downloaded from mail server 33. Then, the binary data of the firmware is transmitted to image formation apparatus 11, and rewriting is permitted.

Figure 11:
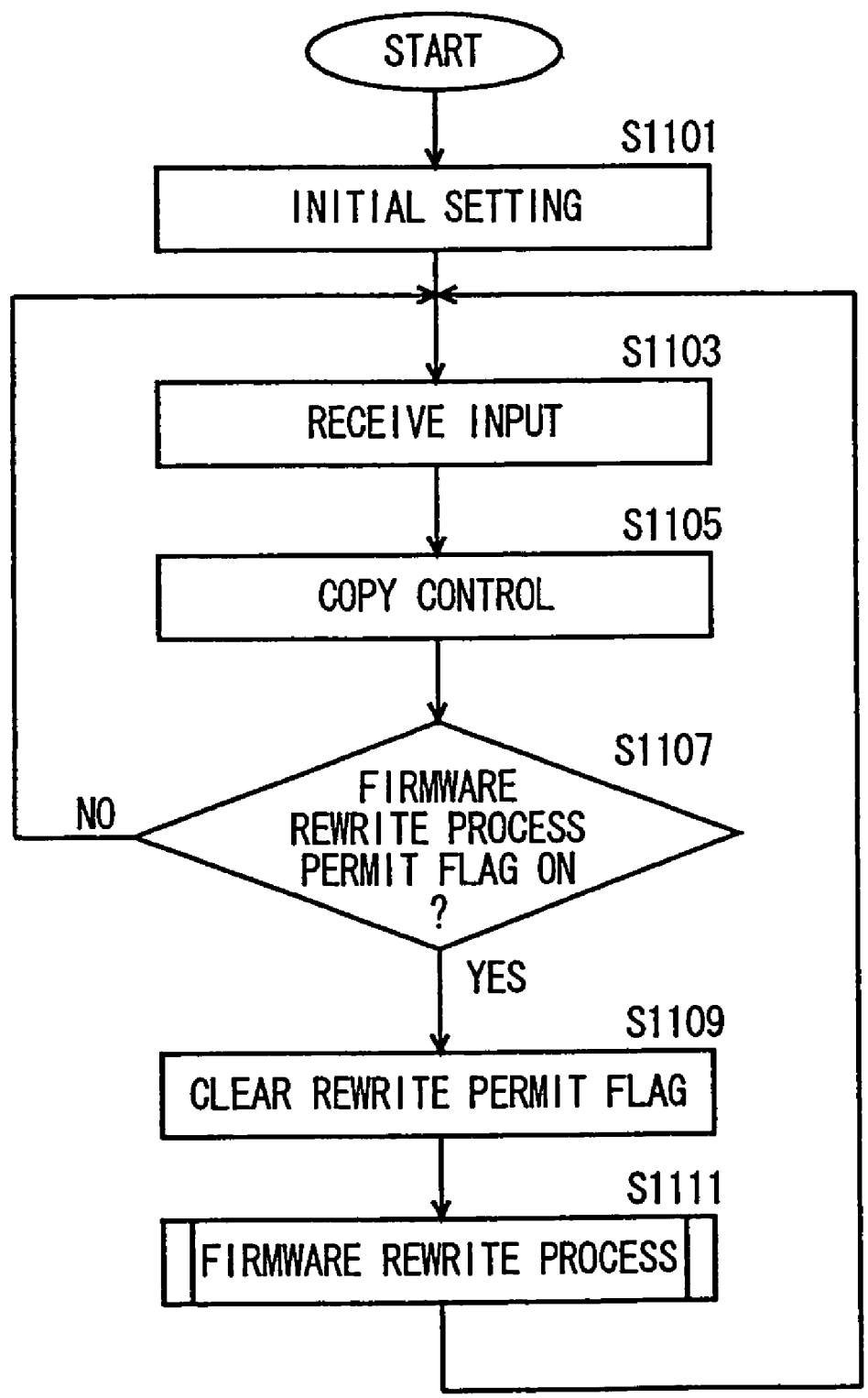
FIG. 11 is a flow chart of the basic process of an image formation apparatus.

The process is carried out by image formation apparatus 11 will be described here. FIG. 11 is a flow chart of the basic process of image formation apparatus 11. The basic process is executed by CPU 111 of image formation apparatus 11. Image formation apparatus 11 commences the process by having power turned on. At each control module, initial setting such as clearing the memory and the setting the standard mode is carried out (step S1101). Then, a process of input reception (step S103) and copy control (step S1105) is repeatedly executed until a firmware reception notification is issued from printer controller 21.

At step S1103, reception of various input signals is carried out at one time. Here, the input signal includes input signals from the key switch group on operation panel 118 of image formation apparatus 11 and from various sensor groups in the apparatus, or a print job transmitted from printer controller 21.

At step S1105, a copy control process, i.e., the process required for the operation of image formation apparatus 11, is carried out. For example, the process includes control of various operation units such as sheet feed control, scanning control, photoreceptor drum control, and developer control, or a process according to a print job or the like from printer controller 21.

When a firmware reception notification is issued from printer controller 21 and the firmware rewrite process permit flag is turned on (in FIG. 11, rewrite permit flag on at step S1107→YES at step S110), control proceeds to step S1109 where the rewrite permit flag is cleared. At step S1111, a firmware rewrite process is carried out.

When the firmware rewrite process ends, control returns to step S1103. The process of step 1103 and step S1105 is repeated until firmware reception is notified and the rewrite permit flag is turned on.

A firmware rewrite process of image formation apparatus 11 will be described hereinafter. The firmware and the target control module number transmitted from printer controller 21 via serial I/F 205 are received at CPU 111 via serial I/F 117 of image formation apparatus 11. When firmware is received at CPU 111, the flash ROM of the target control module of the received firmware is rewritten as set forth below.

Figure 12:
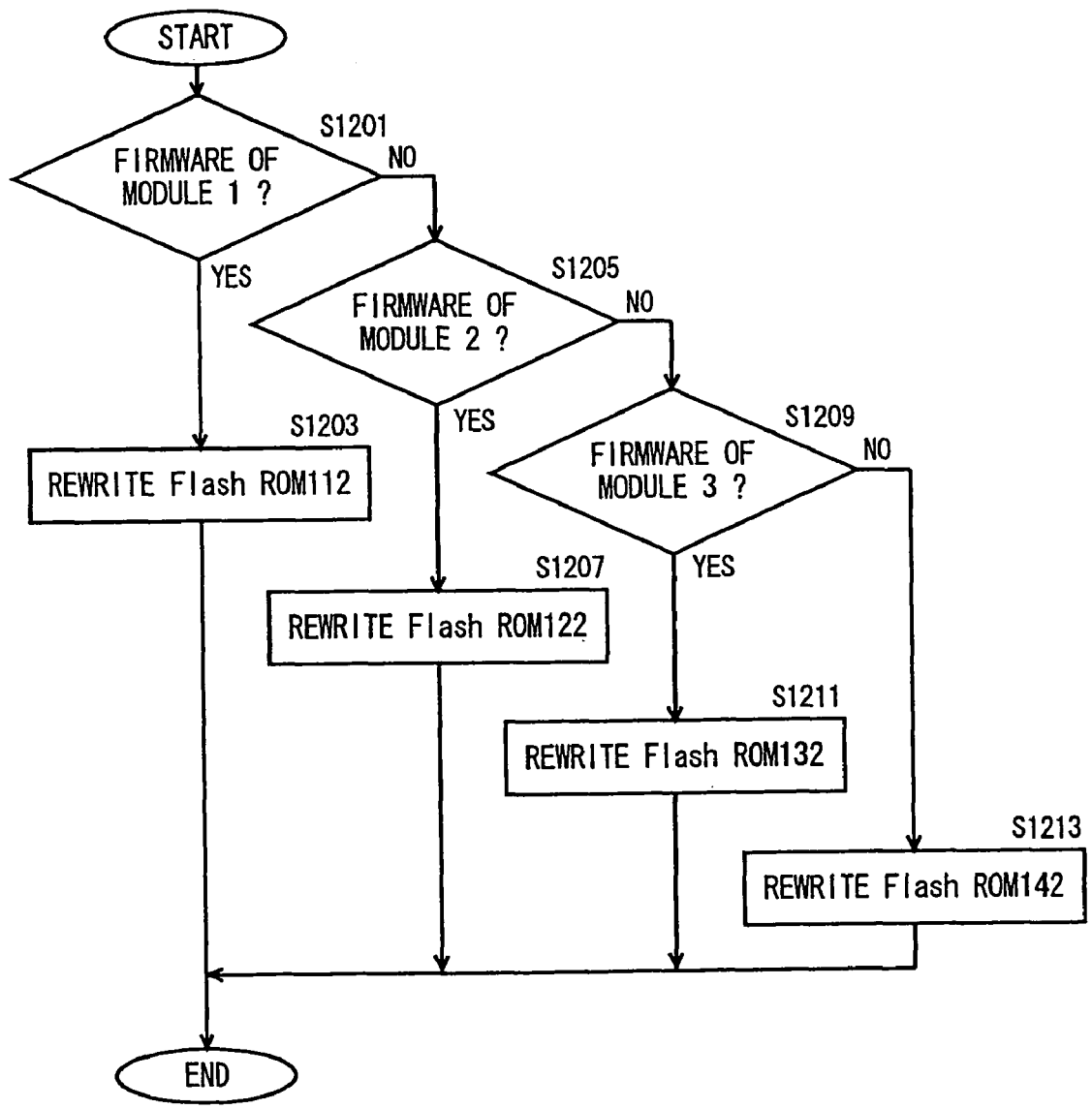
FIG. 12 is a flow chart of the details of a firmware rewrite process of an image formation apparatus.

FIG. 12 is a flow chart of the details of a firmware rewrite process (step S1111 of FIG. 11) in image formation apparatus 11. By steps S1201, S1205 and S1209, determination is made of which of control modules 1-4 the received firmware corresponds to.

When determination is made that the firmware corresponds to control module 1 (YES at step S1201), control proceeds to step S1203 where the new firmware is written into flash ROM 112.

When determination is made that the received firmware corresponds to control module 2 (YES at step S1205), the firmware is transferred from CPU 111 to CPU 121 of control module 2. At step S1207, the new firmware is written into flash ROM 122.

When determination is made that the received firmware corresponds to control module 3 (YES at step S1209), the firmware is transferred from CPU 111 to CPU 131 of control module 3. At step S1211, the new firmware is written into flash ROM 132.

When determination is made that the received firmware corresponds to control module 4 (NO at step S1209), the firmware is transferred from CPU 111 to CPU 141 of control module 4 via CPU 121. At step S1213, the firmware is written into flash ROM 142.

Thus, the firmware of image formation apparatus 11 is written into a predetermined region in the flash ROM corresponding to an appropriately corresponding module.

Figure 13:
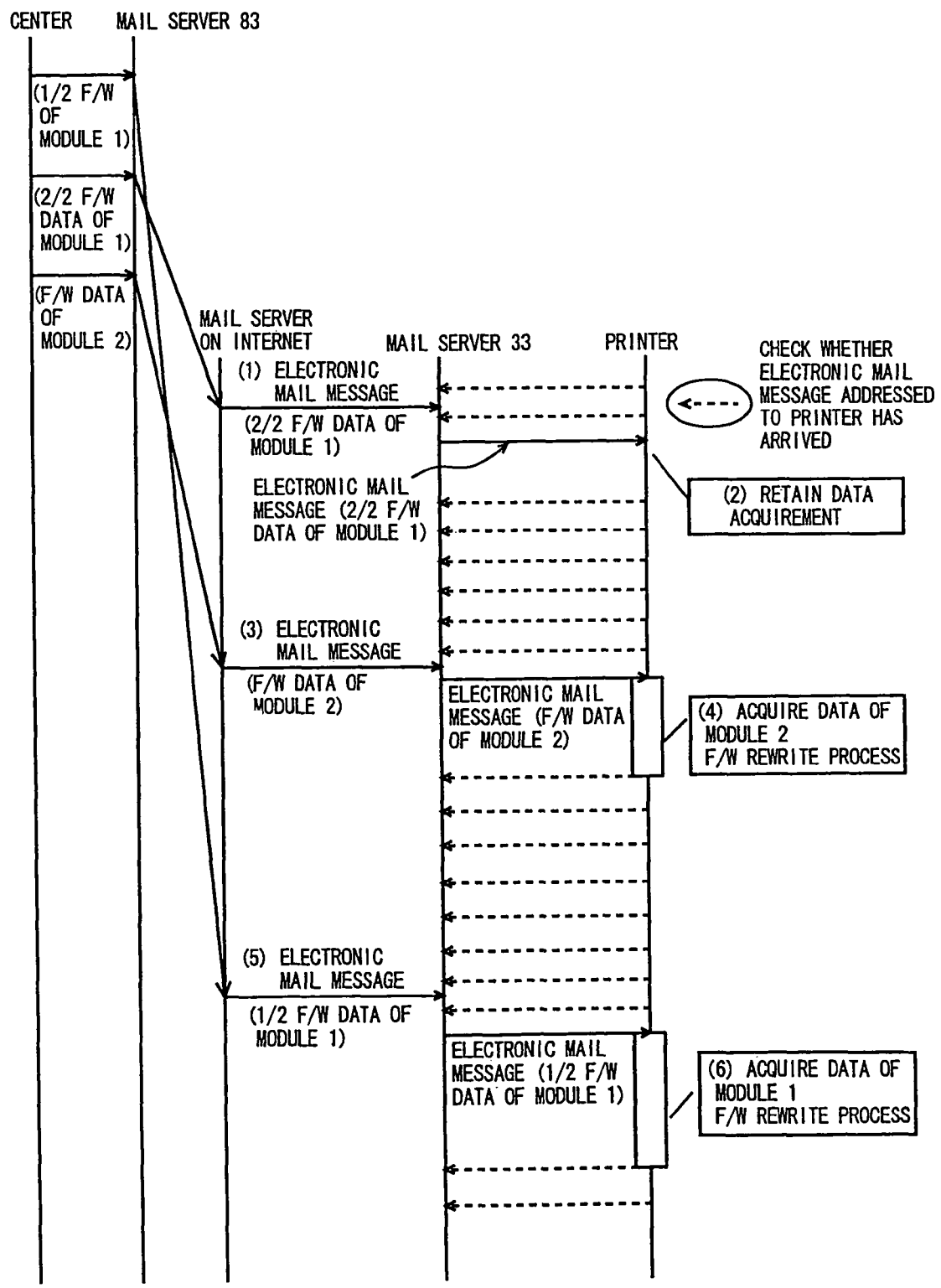
FIG. 13 is a diagram to describe the flow of each process of a computer, mail servers, and a user's image formation apparatus.

The flow of each process of computer 91 of the service center side, mail servers 83 and 33, and image formation apparatus (printer) 11 of the user side will be described briefly in time series with reference to FIG. 13. In FIG. 13, computer 91 of the service center, mail server 83 of the service center, the mail server on the Internet, mail server 33 of user's image formation apparatus (printer) 11, and user's printer 11 are indicated in order from the left. It is assumed that the time axis is directed downwards.

As mentioned before, there are a plurality of mail servers on the Internet between router 82 and router 32. Electronic mail is transferred via an undefined number of a plurality of mail servers. When electronic mail is to be transmitted from a transmission source to a destination, transmission will be effected via a plurality of mail servers. In the Internet, the infrastructure does not guarantee data transmission to the transmission destination, does not guarantee the data transmission order, and there is a possibility of transmitted data being missing.

FIG. 13 corresponds to the case where the mail server of a printer receives electronic mail in an order differing from the transmitted order of electronic mail from the center in such an environment. Specifically, from the center are transmitted electronic mail with firmware (also termed FW) of 1/2 of module 1 attached, electronic mail with FW of 2/2 of module 1 attached, and electronic mail with FW of module 2 attached in order. However, mail server 33 of the printer has received in order the electronic mail with FW of 2/2 of module 1 attached, electronic mail with FW of module 2 attached, and then electronic mail with FW of 1/2 of module 1 attached.

Referring to FIG. 13, image formation apparatus (printer) 11 first checks whether new mail has arrived at mail server 33 for every constant period of time (dotted arrow). When electronic mail with firmware (2/2) of division number 2 of module 2 is received at mail server 33 (1), the subject information is acquired from that received electronic mail message (2).

Specifically, information is derived that the firmware is divided firmware with respect to one module, and that there is divided firmware with a rewrite order that is ahead of the rewrite order of the current firmware. Therefore, determination is made that the divided firmware is not in a write process allowable state. The message is not downloaded. Waiting is conducted for transmission of divided firmware that has a precedent rewrite order.

When electronic mail with firmware of module 2 attached is received at mail server 33 (3), image formation apparatus acquires information of the received message. Since the current message corresponds to one firmware of module 2 that is not divided, determination is made of write process allowable firmware data. Therefore, the message is downloaded at the image formation apparatus 11 side, and the firmware rewrite process of module 2 is conducted (4).

Then, when the firmware (1/2) of division number 1 of module 1 is received at mail server 33 (5), image formation apparatus 11 receives the same and acquires information of the message. Here, that firmware is divided firmware with respect to one module, and has a rewrite order that is the first of the divided firmware. Therefore, determination is made that the firmware data attains a write allowable state. Since the divided firmware of the next rewrite order (2/2) previously confirmed with respect to this module is identified as allowing writing after the first firmware has been rewritten, determination is made of firmware that allows a writing process.

Therefore, both divided firmware (1/2) and (2/2) corresponding to module 1 stored in mail server 33 are both downloaded. Writing to the flash ROM of module 1 is effected (6).

Thus, the firmware is not rewritten in the exact order of the received message at mail server 33. In sequence, the divided firmware determined as attaining a firmware rewrite process allowable state on a module-by-module basis is downloaded, and a rewrite process is conducted. Therefore, the inconvenience of the apparatus not operating properly due to difference in the firmware rewrite order can be prevented.

The above description is based on the case where the electronic mail message with firmware attached is retained in the mail server until determination is made of a firmware rewrite process allowable state. Alternatively, the data can be stored on the part of image formation apparatus 11 or printer controller 21.

In other words, printer controller 21 receiving an electronic mail message downloads the message irrespective of whether the message has rewritable firmware or not. The data is stored in a memory, and then transmitted to image formation apparatus 11 when the divided firmware data attains a rewrite allowable state. Permission of rewriting can be granted after transmission to image formation apparatus 11. This operation will be described briefly hereinafter with reference to FIGS. 14 and 15.

Figure 14:
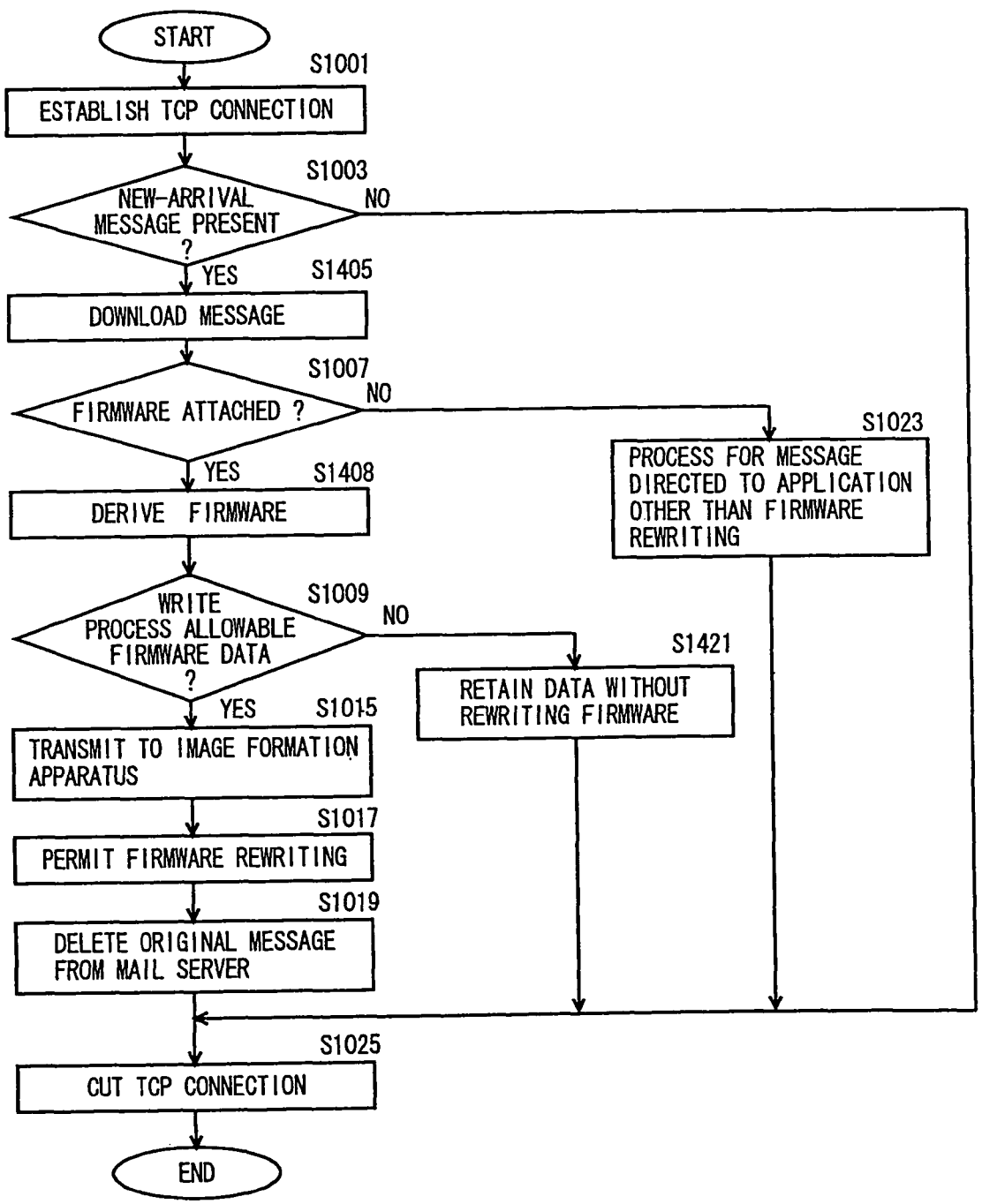
FIG. 14 is a flow chart of the details of a firmware read out process when firmware data is retained at the printer controller side.

FIG. 14 is a flow chart of the details of a firmware read out process (step S909 of FIG. 9) when firmware data is retained at the printer controller 21 side. When determination is made of new-arrival mail at step S1003, printer controller 21 downloads the message (step S1405), differing from the process of the flow chart of FIG. 10.

Firmware is derived from the downloaded data (step S1408). The derived firmware data is retained and the firmware is not rewritten (step S1421) until presence of write process allowable firmware is identified.

At the time point where writable firmware is identified (YES at step S1009), all the relevant firmware data derived is transmitted to image formation apparatus 11 (step S1015). Then, a firmware rewrite permission is granted (step S1017).

Figure 15:
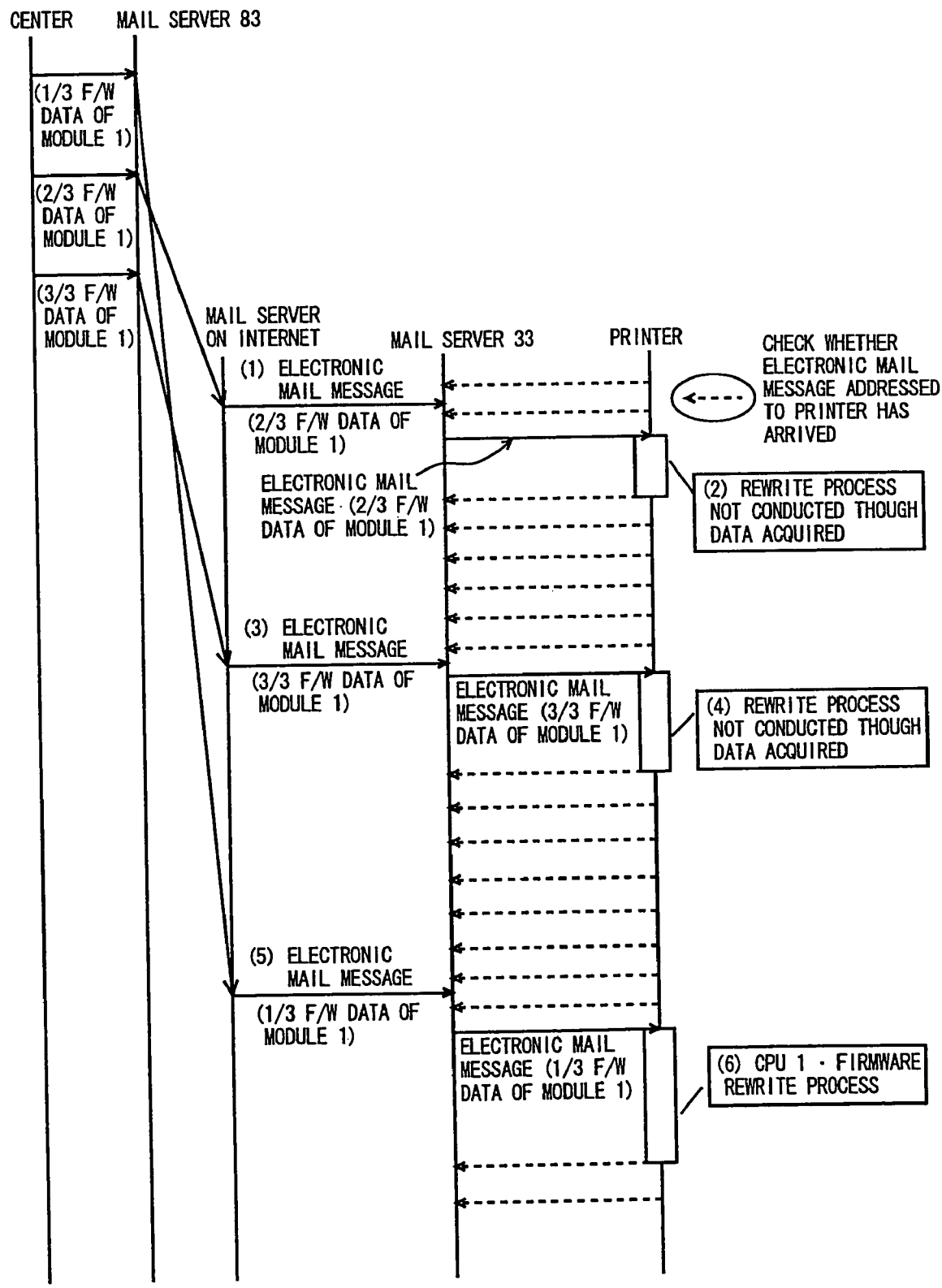
FIG. 15 is a diagram to describe the flow of each process of a computer, mail servers, and an image formation apparatus of the user side.

FIG. 15 is a diagram to describe the flow of each process of computer 91 of the service center, mail server 83 of the service center, mail server 33 of user's image formation apparatus (printer) 11, and user's printer 11.

FIG. 15 corresponds to the case where mail server 33 of the printer receives electronic mail in an order differing from the electronic mail transmitted order from the service center, in an environment similar to that of FIG. 13. Specifically, from the service center are transmitted in sequence electronic mail with the firmware (FW) of 1/3 of module 1 attached, the electronic mail with the FW of 2/3 of module 1 attached, and electronic mail with the FW of 3/3 of module 1 attached. At mail server 33 of the printer, electronic mail with the FW of 2/3 of module 1 attached, the electronic mail of the FW of 3/3 of module 1 attached, and then electronic mail of the FW of 1/3 of module 1 attached are received.

Referring to FIG. 15, when an electronic mail message addressed to printer 11 is received at mail server 33 (1), that message is downloaded irrespective of whether the firmware is writable firmware or not (2). Here, the firmware rewrite process at printer 11 is not carried out since the relevant firmware (2/3) is not writable firmware.

Similarly, when an electronic mail message is received (3), the message is downloaded even if it does not correspond to writable firmware (4). Here, a write process is not conducted since the relevant firmware is not writable firmware.

Subsequently, when the electronic mail message with the remaining divided firmware attached is transmitted (5), the message is downloaded. Also, based on the grant of a firmware rewrite permission, a rewrite process of firmware for module 1 is carried out at printer 11 together with the previously downloaded and derived firmware data (6).

Thus, in the case where an electronic mail message addressed to printer 11 has arrived at mail server 33, the firmware attached to that message is downloaded to the printer 11 side irrespective of whether it corresponds to write process allowable data or not. Therefore, the inconvenience of a message including a plurality of divided firmware being stored in the mail box exceeding the size restriction of the mail server can be circumvented. Furthermore, since the relevant firmware data is downloaded in advance and the stored firmware data is used in the rewrite process, the time required for processing is shortened.

(2) Second Embodiment

In the second embodiment of the present invention, the apparatus of the service center side, the apparatus at the user side, and the electronic mail system constituted by these apparatuses for firmware communication are similar to those of the first embodiment. Therefore, only elements differing from those of the first embodiment will be described here.

Figure 16:
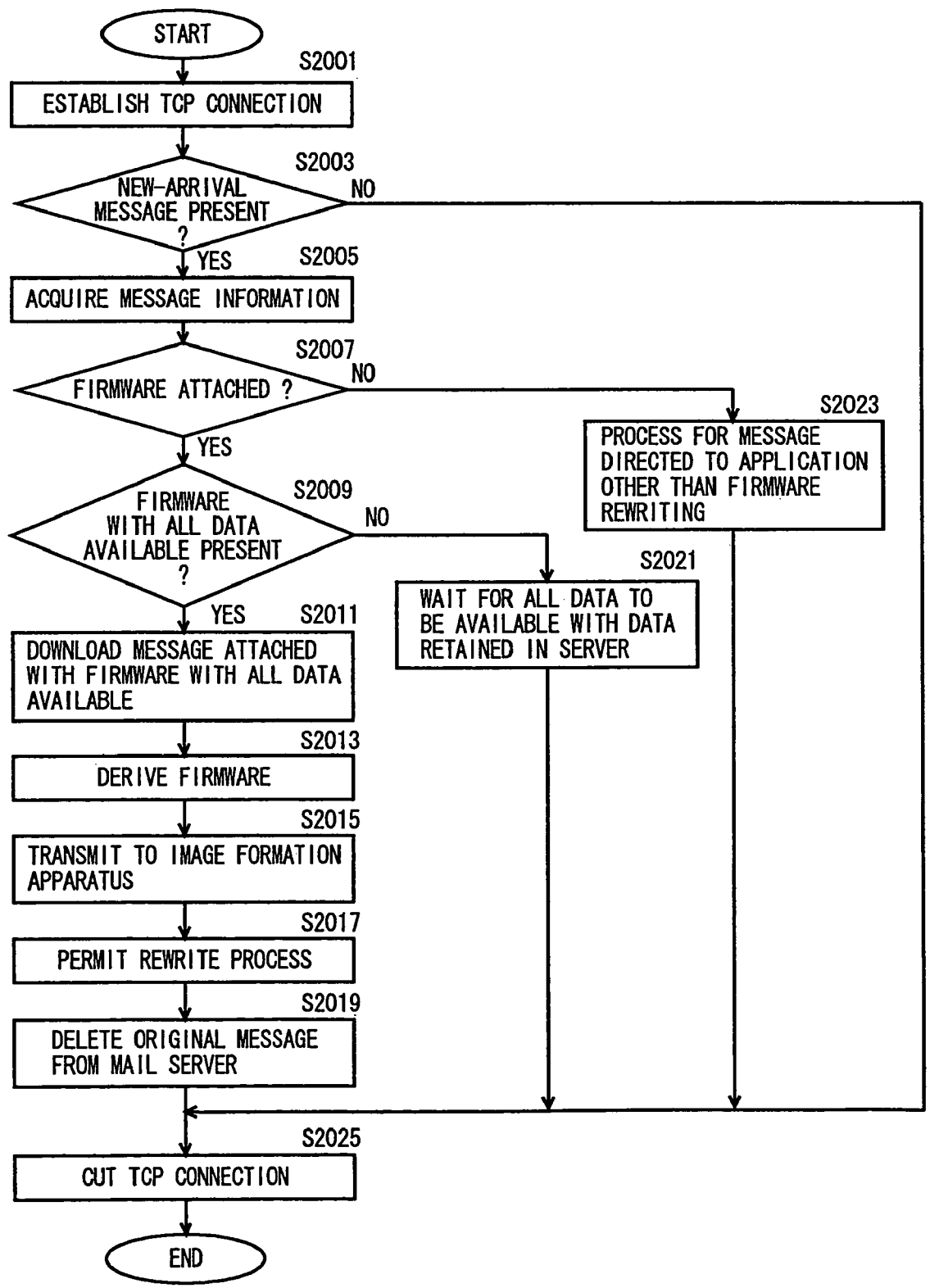
FIG. 16 is a flow chart of the details of a firmware read out process according to a second embodiment.

FIG. 16 is a flow chart of a firmware read out process of the second embodiment corresponding to the firmware read out process of FIG. 9 (step S909). At step 2001, the TCP connection with mail server 33 is established based on the IP address of mail server 33 set at step S905 of FIG. 9. Confirmation is made whether a new message addressed to image formation apparatus 11 has arrived or not (step S2003).

In this confirmation process and in the process that will be described afterwards of downloading the new message addressed to image formation apparatus 11, when arrived at mail server 33, the POP 3 protocol is employed.

When a new message addressed to image information apparatus 11 is delivered to mail server 33 as a result of confirming any new-arrival messages (YES at step S2003), control proceeds to step S2005 where that message is downloaded from mail server 33. The Subject information of the header region in the message is acquired.

At step S2007, determination is made whether the electronic mail has firmware attached. Attachment of firmware can be identified by, for example, whether the description in the field body in the "Content-Description" field in the header region of the message is "Firmware" or not.

In the case where firmware is attached (YES at step S2007), control proceeds to step S2009 where determination is made whether firmware data of a write process allowable state are stored at mail server 33 in an available state. Specifically, when the character of 1/3 or the like indicating division is identified in the Subject field, confirmation is made that the firmware has been divided. Then, the presence of the remaining divided firmware data i.e., the presence of each divided firmware data of 2/3 and 3/3 in the Subject of the same code is checked.

When identification is made of the presence of the relevant firmware data, control proceeds to step S2011 where the message with the writable firmware attached is downloaded from mail server 33 to printer controller 21.

At step S2013, the US-ASCII character of the firmware portion is extracted from the message. The extracted US-ASCII character is restored to binary data by reverse Base 64 conversion. At step S2015, that binary data and module number are transmitted to CPU 111 of image formation apparatus 11 via serial I/F 205.

When the firmware data and module number are transmitted, control proceeds to step S2017 where a firmware rewrite permit flag is turned on with respect to image formation apparatus 11, whereby rewriting is permitted. At step S2019, the original message is deleted from the mail server. At step S2025, the TCP connection with mail server 33 is cut.

When determination is made that the firmware of a write process allowable state are not all available at step S2009 (NO at step S2009), waiting is conducted until all firmware is available with the data left in mail server 33 (step S2021).

When firmware is not attached to the downloaded message (NO at step S2007), control proceeds to step S2023 where the process carried out when a message is received directed to an application other than firmware rewriting is executed in a general manner.

Thus, the message from mail server 33 is downloaded when all the firmware data of a write process allowable state is available at printer controller 21 of image formation apparatus 11. Then binary data of firmware is transmitted to image formation apparatus 11, and rewriting is permitted.

Since the message is downloaded from the mail server only after all the divided firmware required for rewriting is available, the operation of downloading every time a message is received and leaving the divided firmware stored in the apparatus over a long period of time in a unrequited state is eliminated. Therefore, the memory in the apparatus will not be occupied by firmware data of a large size.

Figure 17:
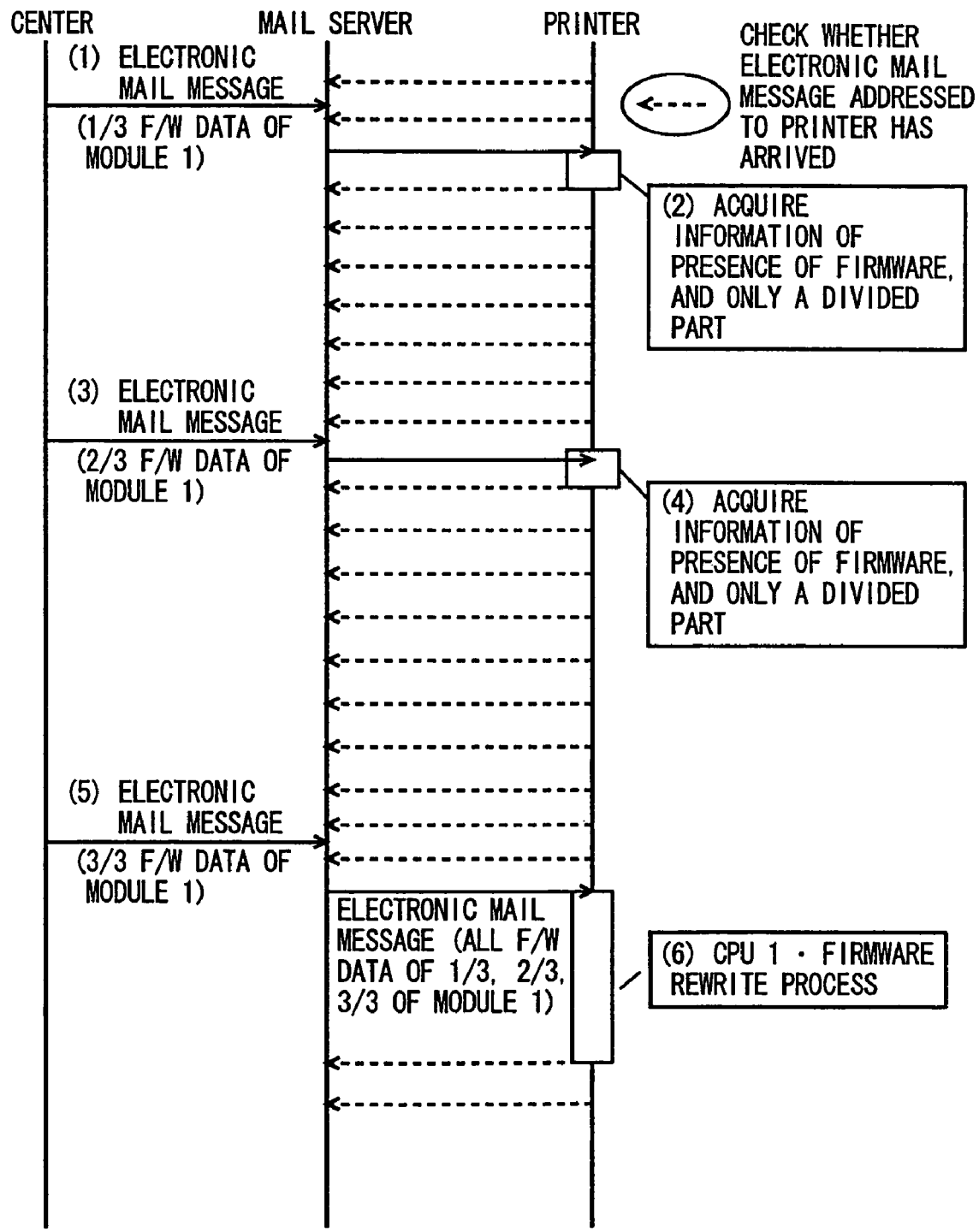
FIG. 17 is a diagram to describe the flow of each process of a computer, mail servers, and an image formation apparatus of the user side in the second embodiment.

The flow of each process of computer 91 of the service center side, mail servers 83 and 33, and image formation apparatus (printer) 11 of the user side of the second embodiment will be described briefly in time series with reference to FIG. 17. In FIG. 17, computer 91, mail servers 83 and 33, and printer 11 are illustrated in order from the left. It is assumed that the time axis is directed downwards.

As described before, there are a plurality of mail servers on the Internet between router 82 and router 32. Electronic mail is transmitted via an undefined number of mail servers. When electronic mail is transmitted from a transmission source to a destination, transmission will be conducted via a plurality of mail servers. In the Internet, the infrastructure does not guarantee data transmission to a transmission destination, does not guarantee the order of data transmission, and there is a possibility of transmitted data being missing. Even if a plurality of electronic mail are transmitted substantially at the same time from the center in such an environment, there are cases where the plurality of electronic mail are received with time lag at the mail server side.

First, image formation apparatus 11 checks whether there is new-arrival mail at every period of time at mail server 33 (dotted arrow). When the firmware (1/3) of division number 1 of module 1 is transmitted from computer 91 of the center side towards image formation apparatus 11 (1), subject information is acquired from the received electronic mail message (2).

Here, information is derived that the firmware is divided with respect to one module and there is no remaining divided firmware for that module. Therefore, the message is not downloaded, and waiting is conducted for the remaining divided firmware to be transmitted.

When electronic mail with firmware of module 2 attached is transmitted from computer 91 of the center side (3), image formation apparatus 11 receives the electronic mail to obtain information of the message (4). Here, information is derived that the firmware is divided firmware (2/3) with respect to one module, and no remaining divided firmware is present. Therefore, the message is not downloaded, and waiting is conducted for transmission of the remaining divided firmware.

Then, when the firmware (3/3) of division number 3 of module 1 is transmitted from computer 91 of the center side (5), image formation apparatus 11 receives the transmitted firmware to obtain information of the message. Here, that firmware is divided firmware with respect to one module, and the presence of the remaining divided firmware with respect to this module has already been confirmed. Therefore, it is identified that all divided firmware for that module is available.

Thus, all the divided firmware corresponding to module 1 (1/3, 2/3 and 2/2) determined to be write process allowable firmware and stored in mail server 33 is downloaded, and written into the relevant flash ROM (6).

Thus, the firmware of the message received at mail server 33 is not immediately rewritten. It is temporarily stored, and a rewrite process is conducted after the predetermined number of firmware is available. For example, when firmware of a module unit is available, the firmware determined as attaining a firmware write process available state is downloaded in sequence. Then, a rewrite process is conducted. Therefore, the inconvenience of the apparatus not operating properly due to the firmware rewrite order being different can be prevented. Also, administration of the memory into which firmware is to be written is expedited.

The present description is based on the case where the electronic mail message with firmware attached is retained in the mail server until determination is made that the firmware can be rewritten. Alternatively, the data can be stored on the part of image formation apparatus 11 or printer controller 21.

Specifically, printer controller 21 receiving an electronic mail message downloads the message regardless of whether the message is a firmware rewritable message or not. The data is stored in a memory. When the firmware data of the module unit is available, the firmware data is transmitted to image formation apparatus 11. Then, rewriting can be permitted. Such an operation will be described briefly hereinafter with reference to FIGS. 18 and 19.

FIG. 18 is a flow chart of the details of a firmware read out process (step S909 in FIG. 9) corresponding to the case where firmware data is retained at the printer controller 21 side. When determination is made of arrival of new mail at step S2003, printer controller 21 downloads the message (step S2405), differing from the process of the flow chart of FIG. 16.

Then, firmware is derived from the downloaded data (step S2408). The derived firmware data is retained, and firmware rewriting is not conducted until all data is available and a write process can be carried out (step S2421).

At the time point when all writable firmware is available (YES at step 2009), all the relevant firmware data is transmitted to image formation apparatus 11 (step S2015). Then, a firmware rewrite permission is granted (step S2017).

Figure 19:
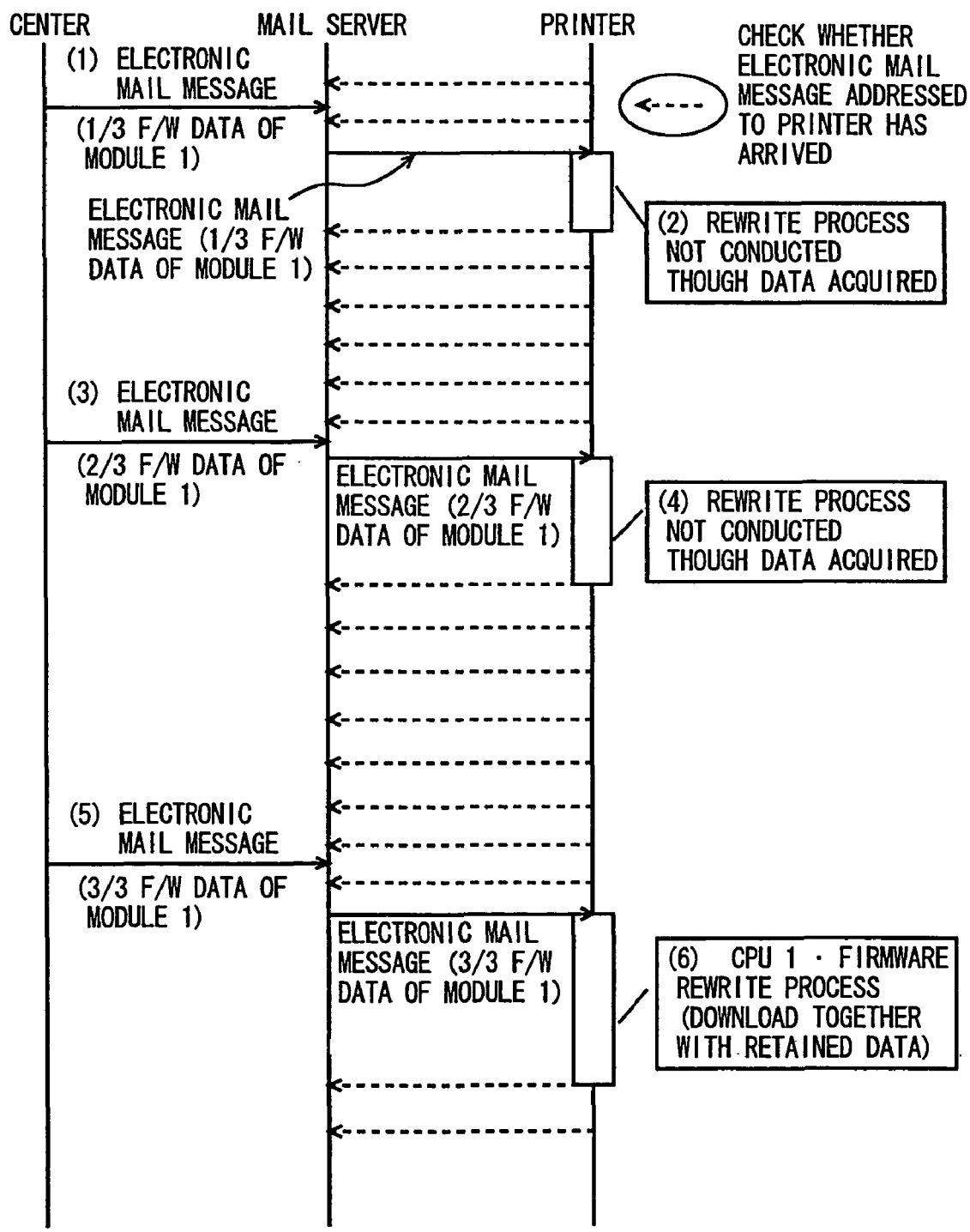
FIG. 19 is a diagram to describe the flow of each process of a computer, mail servers, and an image formation apparatus of the user side.

FIG. 19 is a diagram to describe the flow of each process of computer 91 at the service center side, mail servers 83 and 33, and user's printer (image formation apparatus) 11.

According to the process of FIG. 19, when image formation apparatus 11 receives an electronic mail message (1), that message is downloaded irrespective of whether the included firmware is rewritable or not (2). In the present example, a firmware rewrite process is not conducted here.

Similarly, upon reception of an electronic mail message (3), the message is downloaded irrespective of whether the included firmware is writable or not (4). In the present example, a firmware rewrite process is not conducted here.

Then, when the remaining electronic mail message with firmware attached is transmitted (5), printer controller 21 downloads the message, and permits firmware rewriting since all firmware data is available. At printer 11, a firmware rewrite process for module 1 together with the previously downloaded and derived firmware data is carried out (6).

Thus, in the case where an electronic mail message addressed to image formation apparatus 11 has arrived at mail server 33, the firmware attached to the message is downloaded to printer controller 21 irrespective of whether the data attains a write process allowable state or not. Therefore, the inconvenience of message including a plurality of firmware being stored in the mail box to exceed the size restriction of the mail server can be circumvented. Also, since stored firmware data downloaded in advance is used in the rewrite process, the processing time can be shortened.

According to the present embodiment, control of memory writing is expedited since a plurality of divided firmware is written into the memory at one time in a module unit. Also, error in writing can be supervised on a memory-by-memory basis, and writing error can be cancelled on a module-by-module basis.

(3) Third Embodiment

In the third embodiment of the present invention, the apparatus at the service center side, the apparatus at the user side, and the electronic mail system constituted by these apparatuses for firmware transmission are similar to those of the first embodiment. In the third embodiment, only the elements differing from those of the first embodiment will be described.

Figure 20:
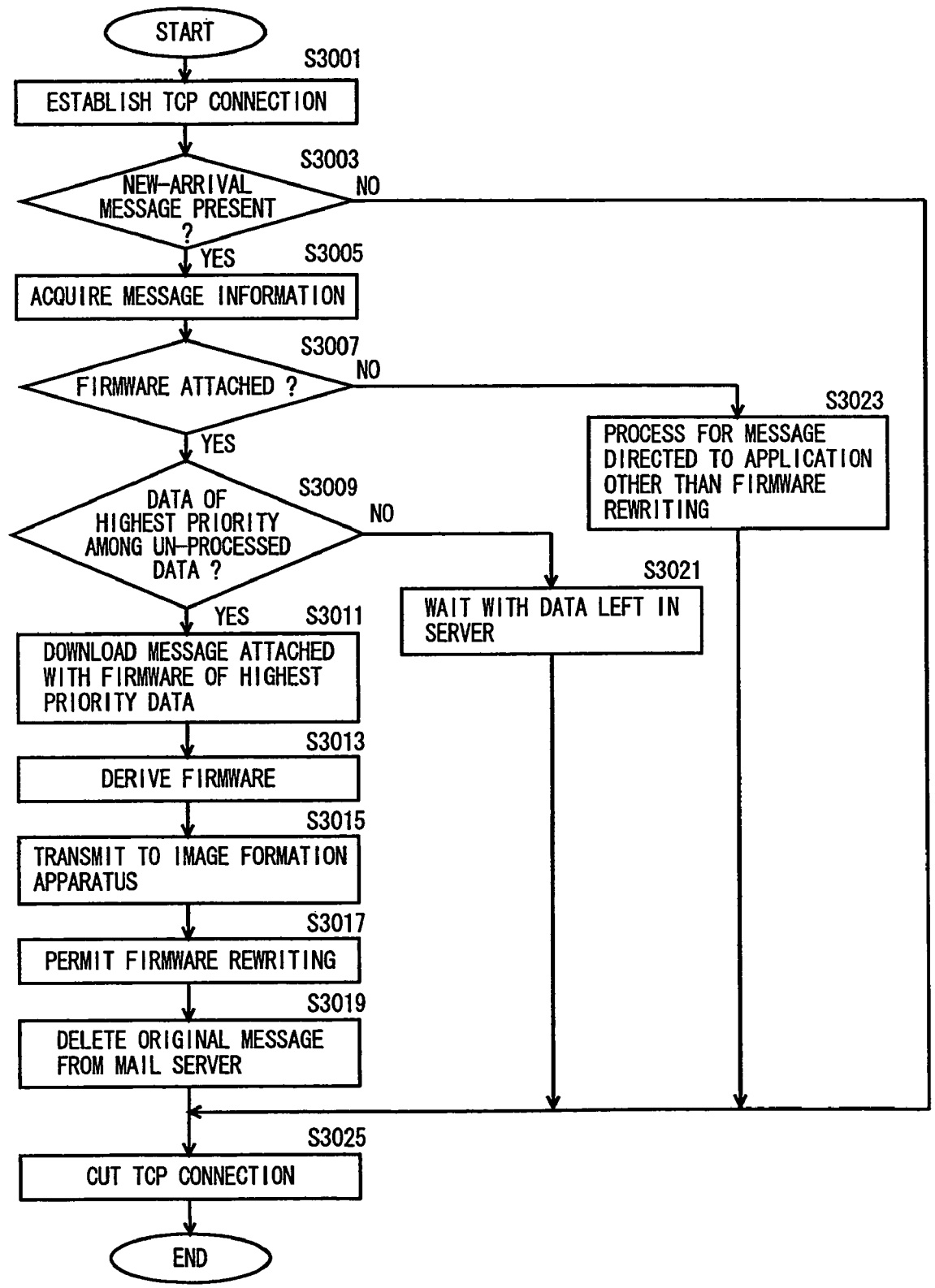
FIG. 20 is a flow chart of the details of a firmware read out process according to a third embodiment.

FIG. 20 is a flow chart of the details of a firmware read process (step S909) of FIG. 9. At step S3001, the TCP connection with mail server 33 is established based on the IP address of mail server 33 set at step S905 of FIG. 9. Delivery of a new message addressed to image formation apparatus 11 is confirmed (step S3003).

A POP 3 protocol is used in this confirmation process and the process that will be described afterwards of downloading a new message addressed to image formation apparatus 11, when delivered to mail server 33. When a new message addressed to image information apparatus 11 is delivered to mail server 33 as a result of confirming any new-arrival messages (YES at step S3003), control proceeds to step S3005 where that message is downloaded from mail server 33. The Subject information of the header region in the message is acquired.

At step S3007, determination is made whether the electronic mail has firmware attached. Attachment of firmware can be identified by, for example, whether the description in the field body in the "Content-Description" field in the header region of the message is "Firmware" or not.

When firmware is attached (YES at step S3007), control proceeds to step S3009 where determination is made whether that firmware data has the highest priority level among data that are not processed. In other words, a plurality of firmware data having the firmware write order determined is sequentially written starting from the firmware data with the highest priority level. Therefore, determination is made whether the firmware data attains a write process allowable state based on the priority level of the target firmware.

For example, when the character of 2/3 and the like indicating division appears in the Subject field, it is recognized that the firmware has been divided. It is also recognized that there are three firmware having the priority level determined, and the current target firmware is that of the second priority level. Therefore, a check is made whether firmware of higher priority level, i.e. firmware with the character of 1/3 in the Subject field of the same code, has already been processed or not.

When confirmation is made that firmware data of higher priority level has already ended its write process, control proceeds to step S3011 where the message with the target firmware attached is downloaded from mail server 33 to printer controller 21 since that target firmware has the highest priority among data that is not yet processed, i.e. the target firmware attains a write process allowable state.

At step S3013, the US-ASCII character in the firmware region is extracted from the downloaded message. The extracted US-ASCII character is restored into binary data by reverse Base 64 conversion. At step S3015, that binary data and module number are transmitted to CPU 111 of image formation apparatus 11 via serial I/F 205.

Upon transmission of the firmware data and module number, control proceeds to step S3017 where the firmware rewrite permit flag is turned on with respect to image formation apparatus 11, whereby rewriting is permitted. At step S3019, the original message is deleted from the mail server. At step S3025, the TCP connection with mail server 33 is cut.

When determination is made that the firmware attached to the target message does not attain a write process allowable state at step S3009 (NO at step S3009), the data is left in mail server 33, and waiting is conducted until write process allowable firmware is received (step S3021). For example, in the case where the character of 2/3 or the like indicating division appears in the Subject field, confirmation is made whether firmware data including the character of 1/3 indicating higher priority has already been processed or not. When not yet processed, the data corresponding to 2/3 cannot be subjected to a write process unless the write process of the firmware of 1/3 has been completed. Therefore, determination is made here that the target firmware data of 2/3 does not attain a write allowable state.

In the case where firmware is not attached to the downloaded message (NO at step S3007), control proceeds to step S3023 where a process carried out when a message directed to an application other than firmware rewriting of an image formation apparatus is executed in a general manner.

When there is firmware data in a write process allowable state in printer controller 21 of image formation apparatus 11, the message is downloaded from mail server 33. Then, the binary data of the firmware is transmitted to image formation apparatus 11, and rewrite permission is granted.

Figure 21:
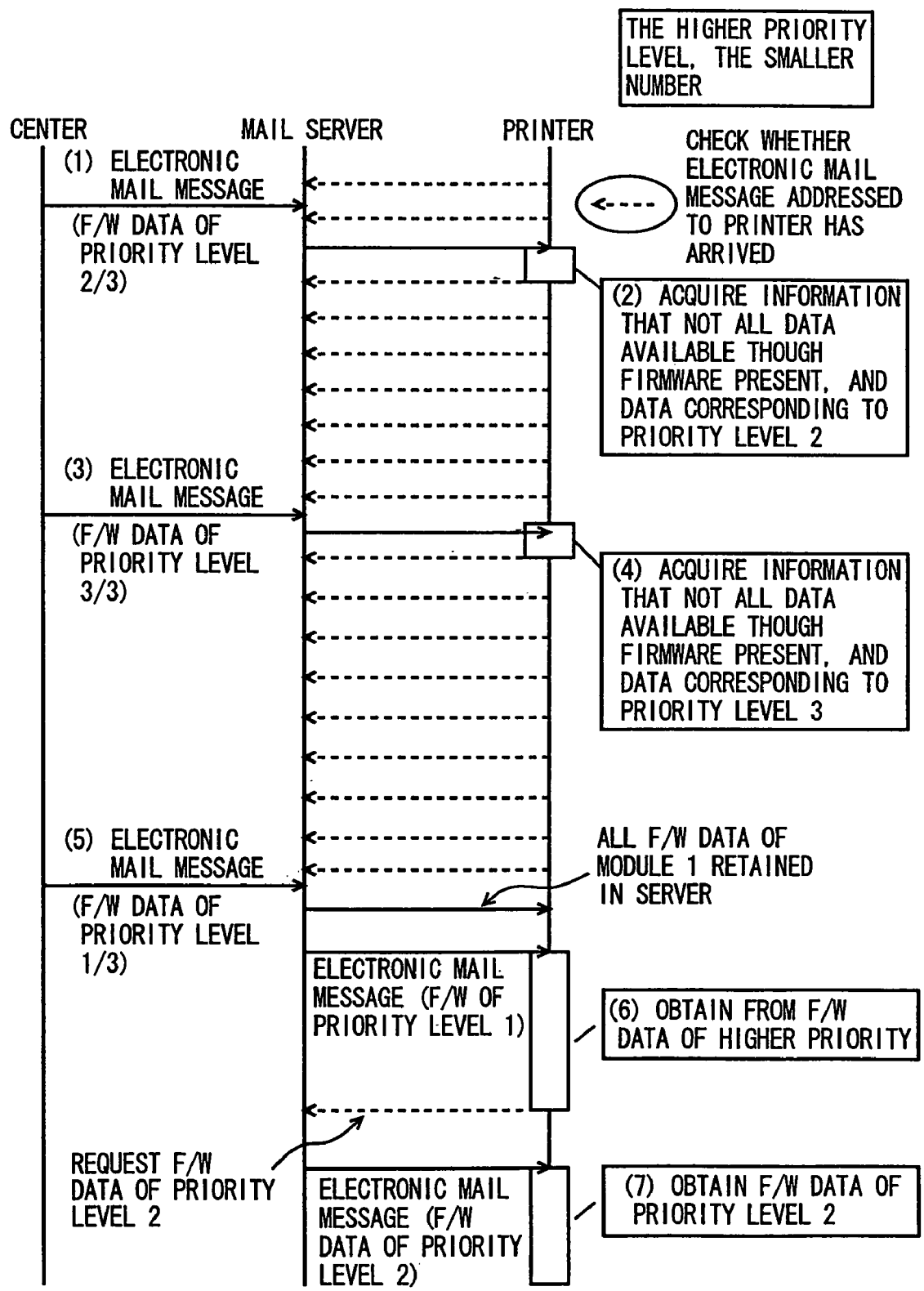
FIG. 21 is a diagram to describe the flow of each process of a computer, mail servers, and an image formation apparatus of the user side in the third embodiment.

The flow of each process of computer 91 of the service center side, mail servers 83 and 33, and user's image formation apparatus (printer) 11 in the third embodiment will be described briefly in time series with reference to FIG. 21. In FIG. 21, computer 91 at the center side, mail servers 83 and 33, and user's printer (image formation apparatus) 11 are indicated in order from the left. It is assumed that the time axis is directed downwards.

According to the process of FIG. 21, image formation apparatus 11 checks whether new mail has arrived or not at every predetermined time (dotted arrow). When firmware having the priority level of 2/3 is transmitted from computer 91 of the center side towards image formation apparatus 11 (1), subject information is acquired from the received electronic mail message (2).

Specifically, information is derived that the target firmware has the second priority level among three firmware having the rewrite order set, and that firmware of a higher priority level is present. Since the write process of the firmware having the first priority level has not yet been carried out, determination is made that the current firmware does not attain a write process allowable state. Therefore, the message will not be downloaded. Waiting is conducted for transmission of firmware of a higher priority level.

When electronic mail attached with firmware having the priority level of 3/3 is transmitted from computer 91 of the center side (3), image formation apparatus 11 receives the electronic mail to acquire information of the message (4).

Specifically, the information is derived that the target firmware is the firmware data having the third priority level among the three firmware having the rewrite order set, and that there is firmware of a higher priority level. Determination is made that the target firmware does not attain a write process allowable state since the writing process of firmware having the first priority level and the second priority level has not yet been conducted. Therefore, the message will not be downloaded. Waiting is conducted for transmission of firmware of higher priority level.

When electronic mail attached with firmware having the priority level of 1/3 is transmitted from computer 91 of the center side (5), image formation apparatus 11 receives the electronic mail to acquire information of the message. Here, the information is derived that the target firmware is firmware data of the highest priority level among three firmware having the rewrite order set.

Thus, determination is made of a write process allowable state, and the message is downloaded (6). Then, a message including the firmware of the next highest priority level (2/3) is downloaded (7). Similarly, the last firmware data is downloaded.

Thus, all the three firmware having the write order set (1/3), (2/3) and (3/3) stored in mail server 33 are downloaded in order, and written into the relevant flash ROM.

The firmware is not written in the received order of the message at mail server 33. Divided firmware determined as attaining a firmware write process allowable state based on the priority level is downloaded in sequence, and a rewrite process is conducted. Therefore, the inconvenience of an apparatus not operating properly due to a different firmware rewrite order can be avoided.

The present description is based on the case where the electronic mail message with firmware attached is left in the mail server until a firmware rewrite process allowable state is determined. Alternatively, the data can be stored at the image formation apparatus 11 or printer controller 21 side.

Specifically, printer controller 21 receiving an electronic mail message downloads the message irrespective of whether it is a firmware rewritable message or not. The downloaded data is stored in a memory. At the time point where the firmware data attains a rewrite allowable state, it is transmitted to image formation apparatus 11, and rewriting can be permitted. This process will be described briefly hereinafter with reference to FIGS. 22 and 23.

Figure 22:
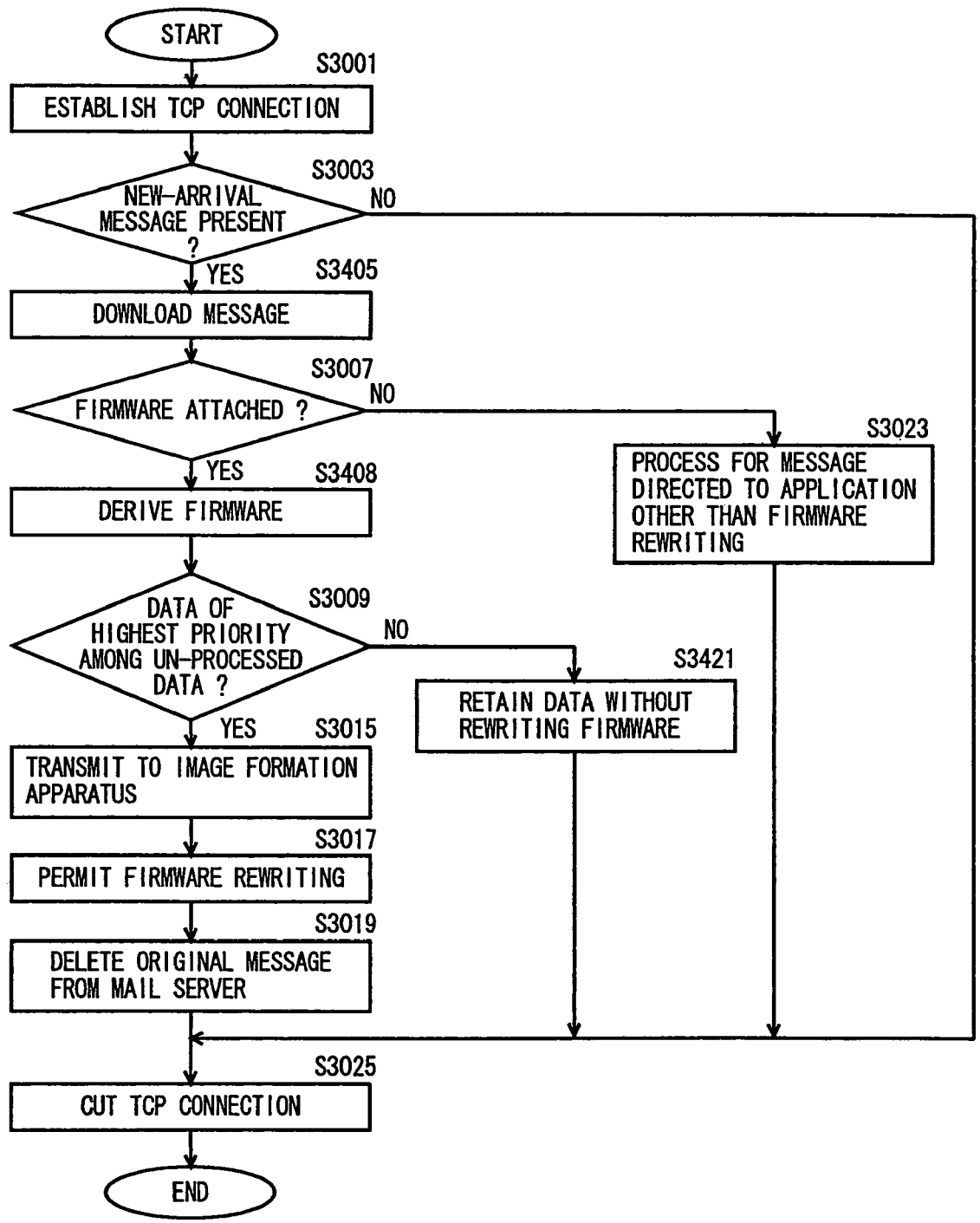
FIG. 22 is a flow chart of the details of a firmware read out process when firmware data is retained at the printer controller side according to the third embodiment.

FIG. 22 is a flow chart of the details of a firmware read out process (step S909 of FIG. 9) corresponding to the case where firmware data is retained at printer controller 21. When determination is made of new-arrival mail at step S3003, printer controller 21 downloads the message (step S3405), differing from the process of FIG. 20.

Firmware is derived from the downloaded data (step S3408). The derived firmware data is retained and the firmware is not rewritten (step S3421) until a write process allowable firmware is present.

At the time point where data having the highest priority level among the data that is not yet processed, i.e. the time point where a write allowable firmware is present (YES at step S3009), all the relevant firmware data is transmitted to image formation apparatus 11 (step S3015). Then, a firmware rewrite permission is granted (step S3017).

Figure 23:
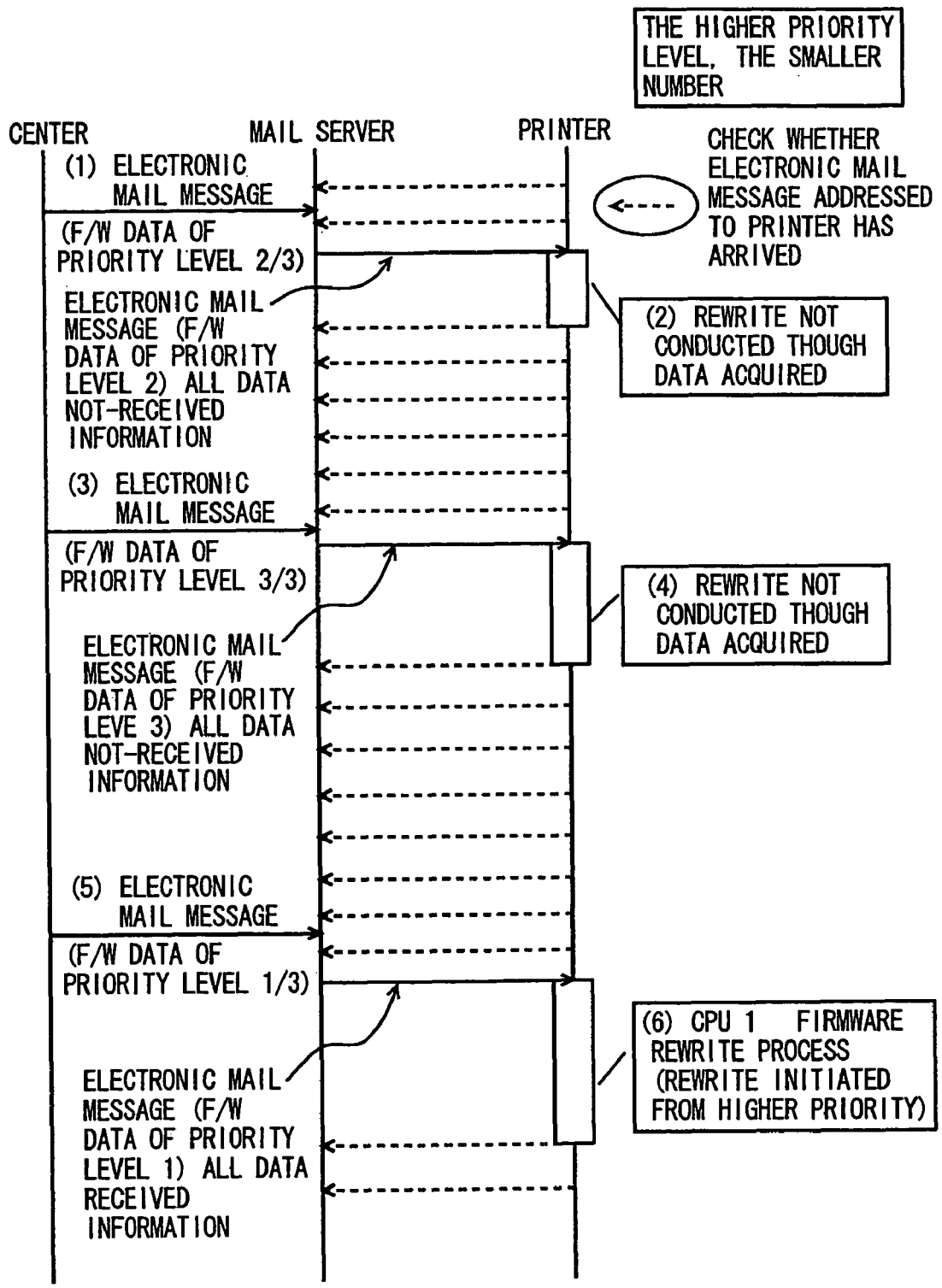
FIG. 23 is a diagram to describe the flow of each process of a computer, mail servers, and an image formation apparatus of the user side in the third embodiment.

FIG. 23 is a diagram to describe the flow of each process of computer 91 of the service center side, mail servers 83 and 33, and user's printer (image formation apparatus) 11.

According to the process of FIG. 23, when printer 11 receives an electronic mail message (1), the message is downloaded irrespective of the priority level, i.e. whether it corresponds to write allowable firmware or not (2). In the present example, a firmware rewrite process is not conducted here.

Similarly, when an electronic mail message of lower priority level is received (3), the message is downloaded irrespective of whether it corresponds to write allowable firmware or not (4). In the present example, a firmware rewrite process is not conducted here.

When electronic mail message with writable firmware attached is transmitted (5), printer controller 21 downloads the message. Also, firmware rewriting is permitted. A firmware rewrite process is carried out at printer 11 together with the previously downloaded firmware data (6).

In the case where an electronic mail message addressed to printer (image formation apparatus) 11 has arrived at mail server 33, the message is downloaded to printer controller 21 irrespective of whether the firmware attached to that message attains a write process allowable state or not. Therefore, the inconvenience of all messages including firmware being stored in the mail box until firmware attaining a write allowable state is received to exceed the size restriction of the mail box can be avoided.

The present invention is described based on an image formation apparatus as the data communication apparatus having firmware that is to be rewritten. However, the present invention is not limited thereto. The present invention is applicable to any device that has communication capability such as a hub or router.

In the present invention, division of firmware is not limited to the case where single firmware is divided. The present invention includes the case where plurality of firmware that are to be transmitted are divided into a plurality of parts according to a predetermined condition.

The module unit implies a control module unit executing a single firmware program, such as a CPU or a functional block including a CPU. As another example, a module unit implies a control module unit that loads a program from a single memory such as a CPU or a functional block including a CPU.

With regards to a firmware write error, an error check can be conducted as set forth below. When firmware is written into a flash ROM prepared for every control module, the value of a check sum calculated at the time of the transmitting the firmware mail is compared with the value of a check sum of the firmware written into the memory to determine a writing error.

The firmware communication method (data communication method) carried out by image formation apparatus 11, computer 91 and printer controller 21 is realized by a program directed to performing the above-described series of process. The data communication program may be installed in respective hard disks of image formation apparatus 1, computer 91, and printer controller 21. Alternatively, the data communication program may be recorded onto a detachable recording medium such as a CD-ROM or a magnetic tape. In any event, the data communication program is recorded in a computer-readable recording medium.

The computer-readable recording medium includes a tape type such as a magnetic tape or cassette tape, a disk type such as a magnetic disk (flexible disk, hard disk device and the like) or an optical disk (CD-ROM/magneto-optical disk/DVD and the like), a card type such as an IC card (including memory card) or optical card, or a medium that retains a program in a non-volatile manner such as a semiconductor, for example, a ROM, EPROM, EEPROM, and flash ROM.

The contents stored in the recording medium is not limited to a program, and may include data.

Here, printer controller 21 and image formation apparatus 11 are described as separate apparatuses as shown in the FIG. 1 and the like. Alternatively, an integral structure with the function of a printer controller 21 incorporated in image formation apparatus 11 can be employed. In this case, printer controller 21 and control module 1 execute a process while establishing liaison with each other. Also, the control implemented by CPU 101 can be executed by CPU 201 of the printer controller.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer-readable medium having stored thereon a data communication program for causing a computer to execute:
   a confirmation step of confirming reception of electronic mail attached with a given firmware from a plurality of firmware, wherein said plurality of firmware correspond to division of firmware for one module into a plurality of parts, each firmware from the plurality having a memory write priority level corresponding to an order of division,
   an acquirement step of acquiring information relating to the priority level of said attached given firmware from said electronic mail,
   a determination step of determining, individually, whether said attached given firmware from the plurality of firmware attains a write allowable state into a predetermined memory based on said acquired information relating to said priority level of said given firmware, and
   a permission step of permitting writing of said given firmware from the plurality of firmware into the predetermined memory, individually, when it is determined that the given firmware attached attains a write allowable state by said determination step.

2. The non-transitory computer-readable medium according to claim 1, wherein said program further causes the computer to execute a write step of writing said given firmware into a predetermined memory when writing is permitted by said permission step, wherein said given firmware from the plurality of firmware is individually written into memory.

3. The non-transitory computer-readable medium according to claim 1, wherein said determination step determines a write allowable state when the priority level of said attached given firmware is highest among firmware not written into a memory out of said plurality of firmware.

4. A data communication apparatus comprising:
   a confirmation portion, of a central processing unit, for confirming reception of electronic mail attached with a given firmware from a plurality of firmware, wherein said plurality of firmware correspond to division of firmware for one module into a plurality of parts, each firmware from the plurality having a memory write priority level corresponding to an order of division,
   an acquirement portion for acquiring information relating to the priority level of said attached given firmware from said electronic mail, a determination portion for determining, individually, whether said attached given firmware from the plurality of firmware attains a write allowable state into a predetermined memory based on said acquired information relating to said priority level of said given firmware, and a permit portion for permitting writing of said given firmware into the predetermined memory, individually, when it is determined that the given firmware attached attains a write allowable state by said determination portion.

5. The data communication apparatus according to claim 4, further comprising a writing portion for writing said given firmware into the predetermined memory when writing is permitted by said permit portion, wherein said given firmware from the plurality of firmware is individually written into memory.

6. A data communication method comprising:

a confirmation step of confirming reception of electronic mail attached with a given firmware from a plurality of firmware, wherein said plurality of firmware correspond to division of firmware for one module into a plurality of parts, each firmware from the plurality having a memory write priority level corresponding to an order of division, an acquirement step of acquiring information relating to the priority level of said attached given firmware from said electronic mail, a determination step of determining, individually, whether said attached given firmware attains a write allowable state into a predetermined memory based on said acquired information relating to said priority level of said given firmware from the plurality of firmware, and a permission step of permitting writing of said given firmware into the predetermined memory, individually, when it is determined that said attached given firmware from the plurality attains a write allowable state by said determination step.

7. A non-transitory recording medium recorded with a data communication program that causes a computer to execute processes of:

acquiring information relating to a rewrite priority level of firmware from electronic mail with one firmware from a plurality of firmware attached, wherein said plurality of firmware correspond to division of firmware for one module into a plurality of parts, determining whether said one firmware attached to electronic mail is writable into a memory based on said acquired information relating to a priority level of said one firmware, wherein said priority level corresponds to an order of division, and writing said one firmware into said memory, individually, when determination is made that writing of said one firmware from the plurality of firmware is allowed by said determination.

* * * * *